US012810023B2

(12) United States Patent
Rolle et al.

(10) Patent No.: US 12,810,023 B2
(45) Date of Patent: Nov. 24, 2026

(54) INTEGRATED PERSONAL DATA CORRECTION AND PROCESSING RESTRICTION IN MULTIPLE APPLICATION LANDSCAPES

(71) Applicant: SAP SE, Walldorf (DE)

(72) Inventors: Benny Rolle, Reinhardshagen (DE); Stefan Hesse, Dresden (DE); Matthias Vogel, Saarbrücken (DE)

(73) Assignee: SAP SE, Walldorf (DE)

( * ) Notice: Subject to any disclaimer, the term of this patent is extended or adjusted under 35 U.S.C. 154(b) by 69 days.

(21) Appl. No.: 18/889,601

(22) Filed: Sep. 19, 2024

(65) Prior Publication Data

US 2026/0080095 A1 Mar. 19, 2026

(51) Int. Cl.
*G06F 21/62* (2013.01)

(52) U.S. Cl.
CPC ................................ *G06F 21/6245* (2013.01)

(58) Field of Classification Search
CPC ............. G06F 21/6245; G06F 21/6218; G06F 2221/2141; G06N 20/00
See application file for complete search history.

(56) References Cited

U.S. PATENT DOCUMENTS

| | | | |
|---|---|---|---|
| 17,186 | A | 5/1857 | Atwater |
| 17,457 | A | 6/1857 | Tidgewell |
| 7,308,704 | B2 | 12/2007 | Vogel et al. |
| 7,350,237 | B2 | 3/2008 | Vogel et al. |
| 7,831,567 | B2 | 11/2010 | Luther et al. |
| 8,566,193 | B2 | 10/2013 | Singh et al. |
| 8,874,551 | B2 | 10/2014 | Rosjat et al. |
| 9,149,407 | B2 | 10/2015 | Hesse et al. |

(Continued)

FOREIGN PATENT DOCUMENTS

| | | |
|---|---|---|
| CA | 3096061 | 4/2023 |
| CN | 114092253 | 2/2022 |

(Continued)

OTHER PUBLICATIONS

U.S. Appl. No. 17/186,934, Rolle et al., filed Feb. 26, 2021

(Continued)

*Primary Examiner* — Catherine Thiaw
*Assistant Examiner* — Amir Mahdi Hajiabbasi
(74) *Attorney, Agent, or Firm* — Fish & Richardson P.C.

(57) ABSTRACT

The present disclosure involves systems, software, and computer implemented methods for data privacy. One example method includes receiving a first request to correct personal data or restrict processing of personal data of a data subject. Response data is identified that is provided by applications in a multiple-application landscape in response to a second request for access to personal data processed by respective applications in a multiple-application landscape. Relevant applications for the first request are identified based on the response data. A data correction or data restriction work package is sent to each relevant application and data correction or data restriction work package responses are received from relevant applications. An overall data correction or data restriction result is determined based on the data correction or data restriction work package responses and is provided in response to the first request.

18 Claims, 6 Drawing Sheets

(56) References Cited

U.S. PATENT DOCUMENTS

| | | | | |
|---|---|---|---|---|
| 9,405,429 | B1 | 8/2016 | Gopalakrishnan | |
| 9,569,869 | B2 | 2/2017 | Hesse et al. | |
| 9,703,813 | B2 | 7/2017 | Hegde et al. | |
| 9,904,796 | B2 | 2/2018 | Pluder et al. | |
| 9,996,592 | B2 | 6/2018 | Hengstler et al. | |
| 10,409,790 | B2 | 9/2019 | Lehnert et al. | |
| 10,430,413 | B2 | 10/2019 | Christoph et al. | |
| 10,552,642 | B2 | 2/2020 | Rolle et al. | |
| 10,642,805 | B1 | 5/2020 | Masse | |
| 10,754,932 | B2 | 8/2020 | Wiederspohn et al. | |
| 10,776,254 | B1 | 9/2020 | Dhayanithi | |
| 10,839,099 | B2 | 11/2020 | Vogel et al. | |
| 10,909,222 | B1 | 2/2021 | Fregly et al. | |
| 11,042,654 | B2 | 6/2021 | Nos et al. | |
| 11,113,417 | B2 | 9/2021 | Rolle | |
| 11,463,416 | B1 | 10/2022 | Ashman et al. | |
| 11,481,513 | B2 | 10/2022 | Rolle | |
| 11,494,546 | B2 | 11/2022 | Rolle | |
| 11,514,065 | B2 | 11/2022 | Rolle | |
| 11,550,781 | B2 | 1/2023 | Rolle et al. | |
| 11,714,828 | B2 | 8/2023 | Rolle et al. | |
| 11,836,241 | B1 * | 12/2023 | Unnikrishnan | G06F 21/41 |
| 12,056,254 | B2 | 8/2024 | Vogel et al. | |
| 12,072,993 | B2 | 8/2024 | Ighoroje et al. | |
| 12,079,358 | B2 | 9/2024 | Ighoroje et al. | |
| 12,086,279 | B2 | 9/2024 | Vogel et al. | |
| 2007/0089117 | A1 | 4/2007 | Samson | |
| 2008/0060051 | A1 | 3/2008 | Lim | |
| 2008/0082538 | A1 * | 4/2008 | Meijer | G06F 16/27 707/999.009 |
| 2008/0174425 | A1 | 7/2008 | Torning | |
| 2009/0210394 | A1 | 8/2009 | Saravanan et al. | |
| 2009/0228340 | A1 | 9/2009 | Bohannon | |
| 2010/0138500 | A1 | 6/2010 | Consul et al. | |
| 2012/0036507 | A1 | 2/2012 | Jonnala et al. | |
| 2013/0347064 | A1 | 12/2013 | Aissi | |
| 2014/0032600 | A1 | 1/2014 | Sarferaz et al. | |
| 2014/0059458 | A1 | 2/2014 | Levien et al. | |
| 2014/0109238 | A1 | 4/2014 | Ravindran | |
| 2014/0172496 | A1 | 6/2014 | Rosjat et al. | |
| 2014/0188572 | A1 | 7/2014 | Hegde et al. | |
| 2014/0267770 | A1 | 9/2014 | Gervautz et al. | |
| 2014/0364983 | A1 | 12/2014 | Bildmayer et al. | |
| 2015/0113459 | A1 | 4/2015 | Hengstler et al. | |
| 2015/0242531 | A1 | 8/2015 | Rodniansky | |
| 2016/0112438 | A1 | 4/2016 | Hengstler et al. | |
| 2016/0335453 | A1 * | 11/2016 | Kounga | H04L 9/0822 |
| 2017/0006135 | A1 | 1/2017 | Siebel et al. | |
| 2017/0034192 | A1 | 2/2017 | Schulman et al. | |
| 2017/0091479 | A1 | 3/2017 | Pluder et al. | |
| 2017/0270163 | A1 | 9/2017 | Christoph et al. | |
| 2018/0101164 | A1 | 4/2018 | Noetzelmann et al. | |
| 2018/0113811 | A1 | 4/2018 | Xing | |
| 2018/0322279 | A1 | 11/2018 | Beskorovajnov et al. | |
| 2019/0018985 | A1 | 1/2019 | Rolle et al. | |
| 2019/0197258 | A1 * | 6/2019 | Acosta | G06F 16/25 |
| 2019/0236294 | A1 | 8/2019 | McDonald et al. | |
| 2019/0236334 | A1 | 8/2019 | Babushkin | |
| 2020/0019728 | A1 | 1/2020 | Rolle | |
| 2020/0133929 | A1 | 4/2020 | Yamashita et al. | |
| 2020/0184104 | A1 | 6/2020 | Barday et al. | |
| 2020/0242233 | A1 * | 7/2020 | Konoura | G06Q 10/06315 |
| 2020/0285766 | A1 | 9/2020 | Jois et al. | |
| 2020/0293679 | A1 | 9/2020 | Bosma et al. | |
| 2020/0342137 | A1 * | 10/2020 | Barday | G06F 16/128 |
| 2021/0051168 | A1 * | 2/2021 | Mei | H04L 63/205 |
| 2021/0089678 | A1 | 3/2021 | Gkoulalas-Divanis et al. | |
| 2021/0141932 | A1 | 5/2021 | Barday et al. | |
| 2021/0192052 | A1 | 6/2021 | Loch et al. | |
| 2021/0200902 | A1 | 7/2021 | Brannon et al. | |
| 2021/0209251 | A1 | 7/2021 | Parthasarathy | |
| 2021/0350022 | A1 | 11/2021 | Brannon et al. | |
| 2022/0043917 | A1 | 2/2022 | Rolle | |
| 2022/0050834 | A1 | 2/2022 | Rolle et al. | |
| 2022/0050920 | A1 | 2/2022 | Rolle | |
| 2022/0058333 | A1 | 2/2022 | Rolle | |
| 2022/0100755 | A1 | 3/2022 | Rolle | |
| 2022/0121777 | A1 | 4/2022 | Brannon et al. | |
| 2022/0207429 | A1 | 6/2022 | Haribhakti et al. | |
| 2022/0277023 | A1 | 9/2022 | Rolle et al. | |
| 2022/0300837 | A1 | 9/2022 | Shmelkin et al. | |
| 2022/0309052 | A1 | 9/2022 | Rolle | |
| 2022/0374339 | A1 | 11/2022 | Brown | |
| 2023/0081785 | A1 | 3/2023 | Zhang | |
| 2023/0101945 | A1 * | 3/2023 | Walton | G06F 21/78 726/26 |
| 2023/0176894 | A1 | 6/2023 | Rolle et al. | |
| 2023/0177180 | A1 | 6/2023 | Rolle | |
| 2023/0177182 | A1 | 6/2023 | Rolle et al. | |
| 2023/0177183 | A1 | 6/2023 | Rolle et al. | |
| 2023/0177186 | A1 | 6/2023 | Ighoroje et al. | |
| 2023/0177187 | A1 | 6/2023 | Vogel et al. | |
| 2023/0177189 | A1 | 6/2023 | Ighoroje et al. | |
| 2023/0177194 | A1 | 6/2023 | Rolle et al. | |
| 2023/0177206 | A1 | 6/2023 | Rolle et al. | |
| 2023/0177213 | A1 | 6/2023 | Rolle et al. | |
| 2023/0179602 | A1 | 6/2023 | Rolle et al. | |
| 2023/0244637 | A1 | 8/2023 | Wu | |
| 2023/0247034 | A1 | 8/2023 | Vogel et al. | |
| 2023/0262094 | A1 | 8/2023 | Patnaikuni et al. | |
| 2023/0385449 | A1 | 11/2023 | Pluder et al. | |
| 2024/0134917 | A1 | 4/2024 | Hesse et al. | |
| 2024/0184895 | A1 | 6/2024 | Vogel et al. | |
| 2024/0184913 | A1 | 6/2024 | Rolle | |
| 2024/0184914 | A1 | 6/2024 | Rolle et al. | |
| 2024/0193298 | A1 | 6/2024 | Rolle et al. | |
| 2024/0241911 | A9 | 7/2024 | Hesse et al. | |
| 2024/0330506 | A1 | 10/2024 | Xu et al. | |
| 2025/0005190 | A1 * | 1/2025 | Shmidov | G06F 21/6245 |
| 2025/0284840 | A1 * | 9/2025 | Meriam | G06F 21/6254 |
| 2026/0004001 | A1 * | 1/2026 | Barnes | G06F 21/6245 |

FOREIGN PATENT DOCUMENTS

| | | | | |
|---|---|---|---|---|
| CN | 115809259 | | 3/2023 | |
| EP | 3553689 | | 10/2019 | |
| IE | 20190191 | A1 * | 7/2021 | |
| KR | 102686822 | B1 * | 7/2024 | G06F 21/6245 |

OTHER PUBLICATIONS

U.S. Appl. No. 18/049,063, Hesse et al., filed Oct. 24, 2022.
U.S. Appl. No. 18/487,283, Vogel et al., filed Oct. 16, 2023.
U.S. Appl. No. 18/487,293, Rolle et al., filed Oct. 16, 2023.
U.S. Appl. No. 18/487,347, Rolle et al., filed Oct. 16, 2023.
U.S. Appl. No. 18/487,365, Rolle et al., filed Oct. 16, 2023.
U.S. Appl. No. 18/487,484, Rolle., filed Oct. 16, 2023.
U.S. Appl. No. 18/629,084, Rolle et al., filed Apr. 8, 2024.
U.S. Appl. No. 18/629,091, Rolle et al., filed Apr. 8, 2024.
U.S. Appl. No. 18/629,100, Rolle et al., filed Apr. 8, 2024.
Final Office Action in U.S. Appl. No. 17/457,811, mailed on May 21, 2024, 34 pages.
Inquaero.com [online], "Fulfill GDPR Art. 17 ("Right to Erasure"): SAP ILM Simplified Blocking and Deletion", Jun. 12, 2018, retrieved on Jan. 27, 2024, retrieved from URL <https://www.inquaero.com/blog/ilm-simplified-blocking-deletion>, 17 pages.
Non-Final Office Action in U.S. Appl. No. 17/457,802, mailed on Apr. 16, 2024, 17 pages.
Non-Final Office Action in U.S. Appl. No. 17/457,811, mailed on Dec. 20, 2023, 27 pages.
Non-Final Office Action in U.S. Appl. No. 17/702,013, mailed on Jan. 4, 2024, 9 pages.
SAP "SAP Asset Manager Security Guide" Dec. 10, 2020, 28 pages.
SAP "SAP Event Stream Processor: Security Guide" Sep. 23, 2019, 58 pages.
Wikipedia.org [online], "Hyperscale computing" created on May 2013, retrieved on Dec. 1, 2022, retrieved from URL <https://en.wikipedia.org/wiki/Hyperscale_computing>, 2 pages.
Wikipedia.org [online], "Information privacy" created on May 2003, retrieved on Dec. 6, 2021, retrieved from URL <https://en.wikipedia.org/wiki/Information privacy>, 7 pages.

(56) References Cited

OTHER PUBLICATIONS

Wikipedia.org [online], “Master Data” created on Oct. 2006, retrieved on Dec. 6, 2021, retrieved from URL <https://en.wikipedia.org/wiki/Master_data>, 2 pages.
Wikipedia.org [online], “Personal Data” created on May 2005, retrieved on Dec. 6, 2021, retrieved from URL <https://en.wikipedia.org/wiki/Personal_data>, 7 pages.
Wikipedia.org [online], “Personal Identifier” created on Feb. 2007, retrieved on Dec. 1, 2022, retrieved from URL <https://en.wikipedia.org/wiki/Personal_identifier>, 3 pages.
Jutla et al., “Pause: A privacy architecture for heterogeneous big data environments.” 2015 IEEE international conference on big data (big data). IEEE, Oct. 2015, 1919-1928.
Kneuper, “Rights of Data Subjects and Their Implementation.” Data Protection for Software Development and IT: A Practical Introduction. Berlin, Heidelberg: Springer Berlin Heidelberg, Dec. 2024, Chapter 4, 107-124.
Non-Final Office Action in U.S. Appl. No. 18/937,147, mailed on Mar. 31, 2026, 29 pages.

* cited by examiner

INTEGRATED PERSONAL DATA CORRECTION AND PROCESSING RESTRICTION IN MULTIPLE APPLICATION LANDSCAPES

TECHNICAL FIELD

The present disclosure relates to computer-implemented methods, software, and systems for data privacy protocols.

BACKGROUND

Applications used for organizations can use master data (such as name and address) and transactional data (such as orders and bills). Transactional data typically references corresponding master data. For instance, a transactional object of type Order can refer to a master data object of type Customer. A given master data object can be referenced by one or more (or perhaps no) transactional objects. In some cases, data may be considered master data in one context and transactional data in another context. For example, insurance contract data may be considered transactional data with respect to a customer object but considered master data with respect to transactional insurance claim data. When an organizational landscape includes multiple systems, a master data replication process can be performed so that master data objects are consistent across systems.

SUMMARY

The present disclosure involves systems, software, and computer implemented methods for data privacy protocols. An example method includes: receiving, at a data privacy integration service, a first request to correct personal data or restrict processing of personal data of a data subject; identifying, by the data privacy integration service, response data provided by applications in a multiple-application landscape provided in response to a second request for access to personal data processed by respective applications in the multiple-application landscape; identifying, by the data privacy integration service and from the applications in the multiple-application landscape and based on the response data, relevant applications for the first request; sending, by the data privacy integration service, a data correction or data restriction work package to each relevant application; receiving, by the data privacy integration service, data correction or data restriction work package responses from relevant applications; determining, by the data privacy integration service and based on the data correction or data restriction work package responses, an overall data correction or data restriction result; and providing, by the data privacy integration service, in response to the first request, the overall data correction or data restriction result.

Implementations can include one or more of the following features. The first request can be evaluated and an automatic determination can be made to accept the first request. A third request can be received to correct personal data or restrict processing of personal data of a data subject. An automatic determination can be made to deny the third request. The automatic determining to accept the first request and to deny the third request can be automatically performed by a trained machine learning engine. The second request can be a previous request provided by the data subject for access to personal data processed by applications in the multiple-application landscape. Identifying the response data can include identifying application responses provided in response to the second request. Identifying the response data can include: determining that no response data is available for any prior requests for the data subject for personal data processed by applications in the multiple-application landscape; in response to determining that no response data is available for any prior requests for the data subject for personal data processed by applications in the multiple-application landscape, initiating an integrated personal data retrieval protocol for applications in the multiple-application landscape; and identifying as the response data, responses from applications in the multiple-application landscape to the integrated personal data retrieval protocol. When the first request is a request to correct first personal data identifying the relevant applications for the first request can include evaluating the response data to identify applications that store the first personal data. When the first request is a request to restrict processing of first personal data, identifying the relevant applications for the first request can include evaluating the response data to identify applications that process the first personal data. The relevant applications for the first request can be identified using a trained machine learning engine. A first data correction or data restriction work package response can indicate one or more recipients of corrected or restricted data. The data privacy integration service can initiate sending of a message to at least one recipient informing the recipient of the corrected or restricted data. At least one relevant application can perform data correction in response to a data correction work package. At least one relevant application can perform restriction of data processing in response to a data restriction work package. A first relevant application can use, in response to receiving a data correction or data restriction work package, a trained machine learning engine to automatically determine whether the first relevant application accepts or denies the data correction or data restriction work package. A first relevant application can use, in response to receiving a data correction or data restriction work package, a trained machine learning engine to automatically determine whether the first relevant application can automatically apply a requested data correction or data restriction in the first relevant application or whether the first relevant application informs an administrator to at least partially apply the data correction or data restriction. A first relevant application, in response to receiving a data correction or data restriction work package can determine that the first relevant application receives data to be corrected or restricted from a second application in the multiple-application landscape and forward information from the data correction or data restriction work package to the second application. The first relevant application can receive a notification from the second application that data has been corrected or restricted in the second application. The first relevant application can include, in a data correction or data restriction work package response sent to the data privacy integration service, information indicating that data has been corrected or restricted in the second application. The data privacy integration service can automatically determine to include the second application as a relevant application for future requests that are similar to the first request.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
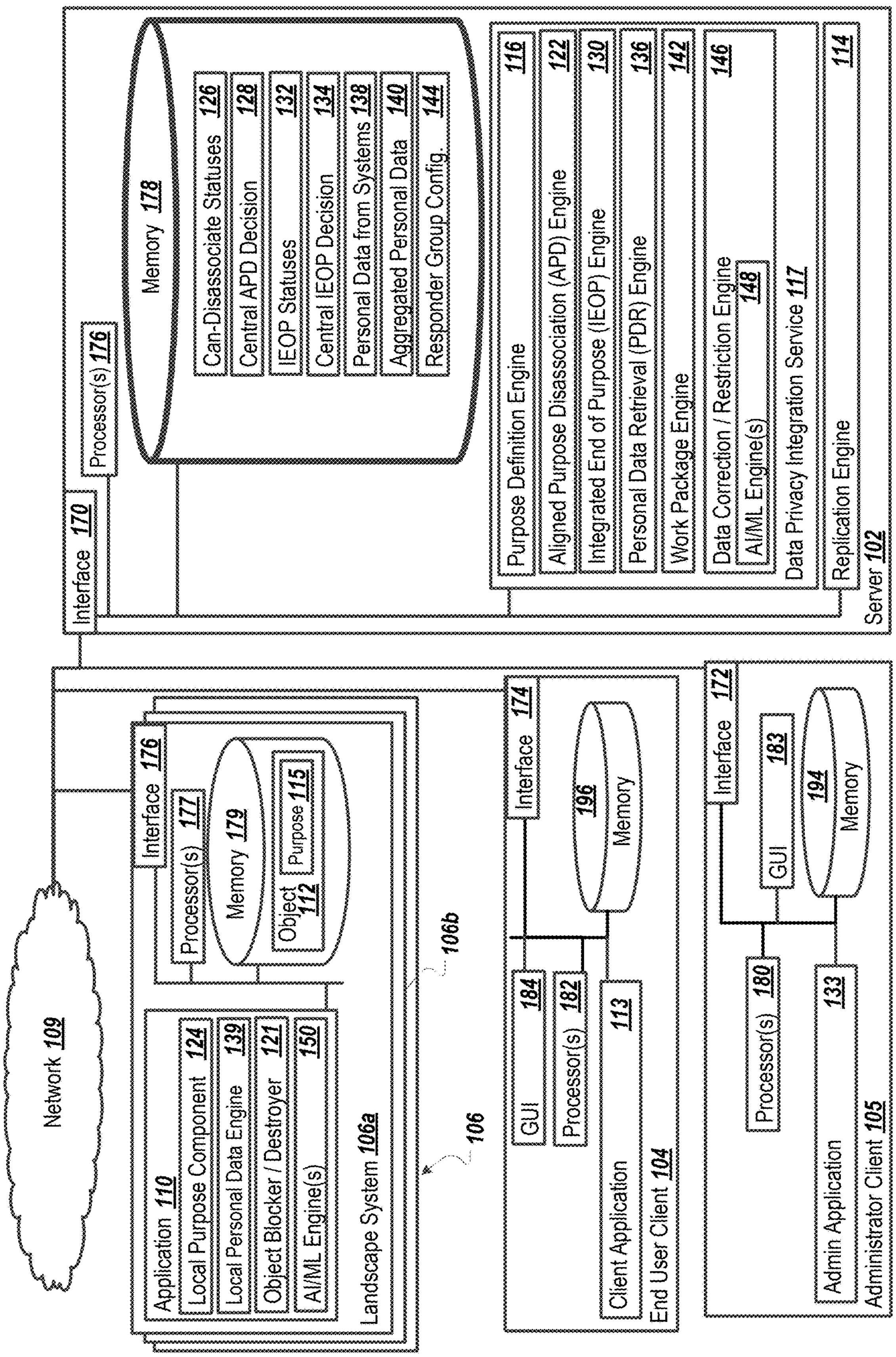
FIG. 1 is a block diagram illustrating an example system for integrated data privacy services.

An integrated multiple-application landscape can include a data privacy integration (DPI) service that provides various functions for integrating personal data related capabilities of different applications. For example, the DPI service can include protocols related to integrated end-of-purpose processing, integrated personal data retrieval, aligned purpose disassociation, and other protocols. An integrated end-of-purpose protocol can be used to aligned different applications on a point in time when personal data should be blocked from further processing. An integrated personal data retrieval protocol can be used to manage receiving exports of personal data from various applications, so that a common report including personal data concerning a same data subject (e.g., natural person, individual) from multiple applications can be generated. An aligned purpose disassociation protocol can be used to align various applications on when a purpose assignment is removed from a data object. The various DPI protocols can be used on-premise and/or in cloud environments, and can be designed as asynchronous protocols using asynchronous communication between the DPI service and the various applications.

The integrated end-of-purpose, integrated personal data retrieval, and aligned purpose disassociation protocols are described in more detail in U.S. patent application Ser. No. 17/457,797, filed on Dec. 6, 2021 entitled "INTEGRATED END-OF-PURPOSE PROTOCOL FOR MULTIPLE APPLICATIONS", U.S. patent application Ser. No. 17/457,811, filed on Dec. 6, 2021 entitled "INTEGRATED PERSONAL DATA RETRIEVAL ACROSS MULTIPLE APPLICATIONS", and U.S. patent application Ser. No. 17/457,802, filed on Dec. 6, 2021 entitled "ALIGNED PURPOSE DISASSOCIATION PROTOCOL FOR MULTIPLE APPLICATIONS", respectively, the entire contents of each which are hereby incorporated by reference.

Applications may expend a non-trivial amount of resources responding to requests from the DPI service. Different approaches can be used to reduce resource consumption. For example, applications can be grouped into what can be referred to as responder groups, where the DPI service asks applications in different responder groups, in turn, to respond to a request. Applications can be grouped according to a resource-reduction strategy. For example, applications that are more likely to provide a veto vote (e.g., cannot-block, cannot-disassociate purpose) can be put into earlier responder groups, to reduce a likelihood of other applications unnecessarily performing integrated end-of-purpose or aligned purpose disassociation processing, respectively. Other examples include putting applications that are more likely to fail a block application in earlier responder groups, or putting applications that are likely to expend more resources responding to a request in a later responder group. Use of responder groups (and use of the DPI service in general) can involve various types of DPI work packages and work package responses sent by different responders. Responder groups and work packages are described in more detail in U.S. patent application Ser. No. 17/718,770, filed on Apr. 12, 2022 entitled "DATA PRIVACY INTEGRATION SERVICES PROCESSING USING MULTIPLE WORK PACKAGES AND MULTIPLE RESPONDER GROUPS", the entire contents of which are hereby incorporated by reference.

The iPDR protocol can handle data subject requests that concern a right of access or a right to data portability. Other data subject rights can include a right to rectification and a right to restriction of processing. The right to rectification (e.g., as codified in Article 16 of the GDPR (General Data Protection Regulation)) gives data subjects a right to request the rectification of inaccurate personal data. For example, a data subject might become aware of inaccurate personal data through the right of access or through any other means. The data controller has a duty to rectify the inaccurate data. However, a determination of whether data is actually inaccurate can be non-trivial. For example, data might be a historic record (e.g., a delivery address for a delivery in the past), and although the data subject might have moved to another address, information indicating a prior delivery was sent to a prior address might still be correct, even if the data subject now lives at another address. Accordingly, in response to data rectification requests, a data controller can make an assessment regarding whether the contested data is inaccurate.

The right to obtain the restriction of processing (e.g., as codified in Article 18 of the GDPR) gives a data subject a right to request from a data controller that the processing of specific personal data is restricted (e.g., if a specific condition applies). For example, a data subject might contest the accuracy of specific personal data and the data controller might need some time to check whether the data contested is accurate or not. The data subject can request to restrict the processing of such data until the data controller has finished the check and determined a decision whether data is to be rectified. As another example, the data subject can request restriction of processing if the data subject believes that data is being processed illegally without any valid legal ground.

When a data controller rectifies personal data in response to a request under the right to rectification or when the data controller restricts the processing of personal data under the right to restriction of processing, further data controller duties may apply. For example, as codified in Article 19 of the GDPR, the data controller may have the duty to communicate the act of rectification or restriction of processing of personal data to recipients of the data. Recipients (e.g., as codified in Article 4(9) of the GDPR) may include users of the system, other legal entities associated with the data controller, data processors, or other data controllers. The data subject can request that the data controller inform the data subject about recipients that were informed under Article. 19 of the GDPR.

Actions taken in response to data correction and/or data restriction requests by a data controller that controls data in multiple applications can be non-trivial, error prone and inefficient due to complexities of data needing correction and or data to be restricted being located at multiple, disparate applications or systems. However, integrated data correction and integrated data restriction processing described herein can provide a solution that enables a data controller to process, in a multiple-application landscape, data subject requests that concern (1) the right to rectification, and/or (2) the right to the restriction of processing in an efficient manner, including reduction of manual effort and increasing a likelihood of successful processing of the requests.

For example, a data privacy integration service can leverage existing PDR processing and results to respond to data correction and/or data restriction requests. For example, after processing of an iPDR ticket is finished, the DPI service can maintain iPDR ticket data for a specific time period rather than immediately deleting the iPDR ticket data. For instance, a data subject may make follow-on data correction and/or data restriction requests after viewing results from a right of access request. The DPI service can obtain efficiencies by evaluating the iPDR ticket data when handling data correction and/or data restriction requests, such as to identify a subset of landscape applications that are relevant for the request. The DPI service can then efficiently handle the data correction and/or data restriction requests. The DPI service can also include other components for added efficiency, such as processing to automatically accept or deny data correction or data restriction requests, and components for automatically handling responses to data correction or data restriction requests. Further solution details are provided below.

The integrated data correction and data restriction processing can achieve various technical advantages. The DPI service can perform integrated, coordinated, central processing of and reaction to data correction and/or data restriction requests, which can enable use of automated and self learning systems for automatic upfront acceptance or denial of requests for the landscape, identification of affected responders, and central processing of data correction or restriction results from multiple applications. By automatically identifying affected responders, resources can be saved by only sending data correction or restriction requests to a subset of landscape applications that are relevant for a given request. Additionally, the central DPI service can generate a central determination of overall success or failure of data correction or restriction across the landscape and provide the overall result to the data subject. A further advantage to central coordination by the DPI service includes simplification and reduction of effort by data controllers for proving compliance by proving that a correction or restriction was implemented across the landscape, since the DPI service can provide a single log with results from all affected systems. Other advantages are described below.

FIG. 1 is a block diagram illustrating an example system 100 for integrated data privacy services. Specifically, the illustrated system 100 includes or is communicably coupled with a server 102, an end-user client device 104, an administrator client device 105, landscape systems 106 (e.g., including a landscape system 106*a* and a landscape system 106*b*), and a network 108. Although shown separately, in some implementations, functionality of two or more systems or servers may be provided by a single system or server. In some implementations, the functionality of one illustrated system, server, or component may be provided by multiple systems, servers, or components, respectively. For example, the server 102 includes different engines which may or may not be provided by a single system or server. Furthermore, although the system 100 is illustrated as being configured for handling operations for one organization, the server 102 and included components are configured to handle operations for multiple organizations (e.g., in a multi-tenant fashion). For instance, each organization may be a customer of a software provider that provides the server 102 (and other servers) and implementations of component included in the server 102. The software provider can also provide at least some of the landscape systems 106, which can each also have multi-tenant architectures.

The landscape systems 106 can include multiple systems that exist in a multi-system landscape. An organization can use different systems, of different types, to run the organization, for example. Other types of systems can be used to provide services for end users. The landscape systems 106 can include systems from a same vendor (e.g., the software provider mentioned above) or different vendors. The landscape systems 106 can each include at least one application 110 for performing organizational processes and working with organizational data. Organizational data can include master data objects and transactional objects. For example, the application 110 can process a master data object 112. An end user of the organization can use a client application 113 (which may be a client version of the application 110) on the end-user client device 104 to consume and/or interact with landscape data, including information from the master data object 112. Regarding the handling of master data objects, various best practices can be applied by an organization. For example, the system 100 can be configured so that corresponding master data objects are consistent across all landscape systems 106. For instance, a replication engine 114 can distribute master data to at least some of the landscape systems 106 so that each application 110 that acts on certain master data can perform processing on the same consistent master data. As described in more detail below, an administrator of the organization can use the administrator client device 105 to perform various administration and/or configuration tasks to configure the landscape systems 106 and/or other tools included in the server 102 (or other servers or systems).

For example, various data protection rules and laws may require that data is only processed for specified purposes. The system 100 can implement a purpose requirement by associating purpose information with each object instance (or portion of an object instance). For example, a purpose 115 has been associated with the master data object 112. A purpose definition engine 116 can be included in a DPI service 117 to enable customers to define purposes for processing personal data that are relevant for the customer.

The landscape system 106 can receive the master data object 112 and the associated purpose 115 from the replication engine 114, for example. The DPI service 117 can determine which applications process objects for which purposes. The replication engine 114 can replicate an object with an assigned purpose to a given landscape system 106 when the landscape system 106 processes objects for that purpose. Purpose-based processing can be performed in the landscape system 106, as described in more detail below.

Objects that no longer have any associated productive purposes can be put into a blocked state for a period of time, in accordance with one or more non-productive purposes, for instance by an object blocker/destroyer 121, before being deleted. For instance, while an object instance with no attached purposes may no longer be used for transactions or have any need to be accessed by production systems, the object can be maintained, in a blocked state, for a certain number of days or years, to enable auditing, for example. An authorized service, such as an audit service, may be enabled to access the blocked object, but other production applications or services can be prevented from accessing the blocked object. As another example, for an application that provides both productive functionality and audit functionality, the audit portion of the application can access blocked data but the productive portion of the application cannot access blocked data.

As part of an aligned purpose disassociation (APD) approach, the landscape systems 106 can disassociate a purpose with an object in response to information received from an aligned purpose disassociation engine 122 of the DPI service 117, rather than solely based on a local decision. For example, each landscape system 106 can provide information to the aligned purpose disassociation engine 122. For example, a local purpose component 124 in each landscape system 106 can determine, for each purpose of an object, whether the purpose can be locally disassociated from the object. In some cases, the local purpose component 124 can determine, without consulting other systems, whether a purpose can be locally disassociated from the object. In other cases, the local purpose component 124 may consult other system(s) when performing the local check. For example, if a first system is integrated with a second system and exchanges data with the second system, but the second system is not integrated with the APD protocol, the first system may contact the second system and consider the status of the second system as part of a local status of the first system for the APD protocol. As another example, the second system may be integrated with the APD protocol but the first system may know that specific circumstances within the second system are relevant for the local status of the first system. For example, the first system may know that a purpose that cannot be disassociated from data within the second system may result in the purpose not being able to be disassociated in the first system. As an example, suppose the first system collects expense information that is transferred to the second system and posted as financial data in the second system. The first system may be integrated with the second system (e.g., before the systems became integrated with the APD protocol) in such a way that the first system can ask the second system whether a purpose can be disassociated from the data.

For example, each landscape system 106 can determine a "can-disassociate" status for a requested purpose and object. A can-disassociate status for a respective landscape system 106 can be either an affirmative can-disassociate status that indicates that the landscape system 106 can disassociate a purpose from an object or a negative can-disassociate status that indicates that the landscape system 106 cannot disassociate the purpose from the object. The aligned purpose disassociation engine 122 can collect received can-disassociate statuses 126. The aligned purpose disassociation engine 122 can evaluate the can-disassociate statuses 126 to determine a central aligned disassociate purpose decision 128 regarding disassociating a purpose from an object. The aligned purpose disassociation engine 122 can determine that the central aligned disassociate purpose decision 128 is to disassociate the purpose from the object if no landscape system 106 is unable to disassociate the purpose from the object. The aligned purpose disassociation engine 122 can determine that the central aligned disassociate purpose decision 128 is to not disassociate the purpose from the object if at least one landscape system 106 is unable to disassociate the purpose from the object. The aligned purpose disassociation engine 122 can provide the central aligned disassociate purpose decision 128 to each landscape system 106. The local purpose component 124 can disassociate the purpose from the object in response to receiving the central aligned disassociate purpose decision 128, if the central aligned disassociate purpose decision 128 is in fact to disassociate the purpose from the object.

The object blocker/destroyer 121 can block an object (e.g., from all production processing) when no productive purposes are associated with the object (e.g., after all productive purposes have been disassociated), according to one or more retention policies. An object can be blocked, rather than destroyed, if one or more retention policies associated with one or more non-productive purposes state that the object is to be maintained for access, outside of productive processing, only by authorized users. The object blocker/destroyer 121 can determine to destroy a blocked object in response to determining that all applicable retention reasons have expired. Object destruction decisions and actions can occur locally and independently in each landscape system 106. For example, each application 110 can determine locally whether a blocked object is to be destroyed. For instance, the application 110 can determine to destroy an object (e.g., a master data object) when no purposes are associated with the object, no transactional data references the object, and no retention policy currently applies to the object. In response to an object destruction decision, the object blocker/destroyer 121 can destroy the object. As described below, object blocking can be aligned across systems, so that, e.g. master data is blocked in all systems at substantially a same point in time to ensure that a first system does not create new transactional data referencing the master data where the new transactional data is replicated to a second system in which the master data had already been blocked.

In some implementations, an iEoP (Integrated End of Purpose) engine 130 of the DPI service 117 is used instead of or in addition to the APD engine 122. The iEoP engine 130 can send EoP queries to each landscape system 106 and receive EoP statuses 132 from the local purpose components 124 of different landscape systems regarding ability to block or delete a particular master data object. The iEoP engine 130 can evaluate the EoP statuses 132 to generate a central EOP decision 134. If a consensus is reached regarding ability to block an object, the iEoP engine 130 can distribute aligned block commands to trigger an aligned blocking of the object across the landscape systems 106. The iEoP engine 130 can also orchestrate integrated unblocking, when unblocking is required due to blocking failure in one or more systems, or for other reasons.

As mentioned, a data subject can have a right to request personal data stored associated with the data subject. The data subject (or the data controller, on behalf of the data subject) can initiate a personal data request from any of the landscape systems 106. For example, the data subject may submit a request using a user interface of the client application 113, with the request being received by the application 110 that handles requests from the client application 113. The application 110 can forward the request to a personal data retrieval (PDR) engine 136 of the DPI service 117. Accordingly, any application within the landscape that is integrated with the DPI service 117 can request a report that, when generated, includes personal data automatically obtained by the DPI service from all of the other applications in the landscape. The data subject, therefore, can trigger a personal data request, in any one of the applications, rather than having to request from all of the applications. The PDR engine 136 automatically requests and receives personal data 138 from respective local personal data engines 139 in different landscape systems 106. The PDR engine 136 then creates aggregated personal data 140 and provides the aggregated personal data 140 to the data subject in response to the request, as a unified and uniform data report. In addition to the APD engine 122, the iEoP engine 130, and the PDR engine 136, the DPI service 117 can include or provide other data privacy integration services.

A work package engine 142 can be used to split requests into multiple work packages. As mentioned above, the DPI service 117 can send requests (e.g., work packages) to applications according to responder group configurations 144.

As mentioned above, the DPI service 117 can maintain the personal data 138 received from different landscape systems in response to PDR protocol requests, for use in responding to other types of requests, such as data correction and/or data restriction requests. For example, the DPI service 117 can use a data correction/restriction engine 146 to handle data correction and data restriction requests received from the end user client 104 or from a given landscape system 106 acting as a requesting application.

The data correction/restriction engine 146 can determine that the personal data 138 includes data for a same data subject that may be relevant for the data correction or data restriction request. In some implementations, the data correction/restriction engine 146 can determine that the personal data 138 does not include data for a same data subject that may be relevant for the data correction or data restriction request and the data correction/restriction engine 146 can first request that the PDR engine 136 perform an iPDR protocol run to generate relevant personal data 138 before the data correction or data restriction request is handled.

The data correction/restriction engine 146 can identify, from among the landscape systems and based on the personal data 138, relevant landscape systems for the data correction or data restriction request. The data correction/restriction engine 146 (e.g., in conjunction with the work package engine 142) can generate and send a data correction or data restriction work package to each relevant landscape system. The data correction/restriction engine 146 can receive and process data correction or data restriction work package responses from the relevant landscape systems to determine an overall data correction or data restriction result (e.g., indicating whether each relevant landscape system was able to correct or restrict processing of personal data, as requested). The DPI service 117 can provide, in response to the data correction or restriction request, the overall data correction or data restriction result (e.g., to the end user client device 104 or other requesting application).

As described in more detail below, the data correction/restriction engine 146 can include various artificial intelligence/machine learning engines 148, which can perform various automated functions, such as determining whether to accept or deny a data correction or data restriction request, automatically identifying relevant landscape systems, and automatically learning and adjusting data correction and/or data restriction request processing based on data correction or data restriction work package responses received from landscape systems. Additionally, a given landscape system such as the landscape system 106*a* can also include various artificial intelligence/machine learning engines 150, which can perform various automated functions, such as determining whether to accept or deny a data correction or data restriction work package or determining whether the landscape system 106*a* can automatically apply or implement the requested data correction or restriction or whether the landscape system 106*a* can send a request to an administrator (e.g., via the administrator client device 105) for an administrator to at least partially apply the data correction or restriction request. Further artificial intelligence/machine learning examples and details are provided below.

Integrated data correction and data restriction examples described herein can differ from data distribution performed using the replication engine 114. For example, while the replication engine 114 can be involved in the distribution of altered data, the replication engine 114 may only be configured to distribute/synchronize master data and may thus not be suitable for distributing corrected versions of data that is not master data or that is master data but not handled by the replication engine 114. For example, if affected data is master data that is handled by the replication engine 114, the behavior of the system 100 may be unclear if not all landscape systems are integrated with the replication engine 114.

Data correction and data restriction processing may run in parallel or sequentially. In parallel processing, a work package can include information that identifies that specific personal data is to be corrected and that the processing of this data is to be restricted. Sequential processing can include separate sending of data correction and data restriction work packages (with either type of work package being sent first to responders).

Although the solution described herein describes use of data received for right of access requests to be used, for example, in processing of data correction and/or data restriction requests, data obtained for prior right of access requests can be used to efficiently handle other requests. For instance, data obtained for right of access requests can be used to implement handling of data subject right to be forgotten requests.

As used in the present disclosure, the term "computer" is intended to encompass any suitable processing device. For example, although FIG. 1 illustrates a single server 102, a single end-user client device 104, a single administrator client device 105, the system 100 can be implemented using a single, stand-alone computing device, two or more servers 102, or multiple client devices. Indeed, the server 102 and the client devices 104 and 105 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the server 102 and the client devices 104 and 105 may be adapted to execute any operating system or runtime environment, including Linux, UNIX, Windows, Mac OS®, Java™, Android™, iOS, BSD (Berkeley Software Distribution) or any other suitable operating system. According to one implementation, the server 102 may also include or be communicably coupled with an e-mail server, a Web server, a caching server, a streaming data server, and/or other suitable server.

Interfaces 170, 172, 173, and 174 are used by the server 102, the end-user client device 104, the landscape system 106*a*, and the administrator client device 105, respectively, for communicating with other systems in a distributed environment—including within the system 100—connected to the network 108. Generally, the interfaces 170, 172, 173, and 174 each comprise logic encoded in software and/or hardware in a suitable combination and operable to communicate with the network 108. More specifically, the interfaces 170, 172, 173, and 174 may each comprise software supporting one or more communication protocols associated with communications such that the network 108 or interface's hardware is operable to communicate physical signals within and outside of the illustrated system 100.

The server 102 includes one or more processors 176. Each processor 176 may be a central processing unit (CPU), a blade, an application specific integrated circuit (ASIC), a field-programmable gate array (FPGA), or another suitable component. Generally, each processor 176 executes instructions and manipulates data to perform the operations of the server 102. Specifically, each processor 176 executes the functionality required to receive and respond to requests from the end-user client device 104, for example. Similarly, each landscape system 106 includes one or more processors 177. Each processor 177. Each processor 177 executes instructions and manipulates data to perform the operations of the respective landscape system 106.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, ABAP (Advanced Business Application Programming), ABAP 00 (Object Oriented), any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The server 102 includes memory 178. In some implementations, the server 102 includes multiple memories. The memory 178 may include any type of memory or database module and may take the form of volatile and/or non-volatile memory including, without limitation, magnetic media, optical media, random access memory (RAM), read-only memory (ROM), removable media, or any other suitable local or remote memory component. The memory 178 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the server 102. Similarly, each landscape system 106 includes memory 179. The memory 179 may store various objects or data associated with the purposes of the landscape system 106.

The end-user client device 104 and the administrator client device 105 may each be any computing device operable to connect to or communicate in the network(s) 108 using a wireline or wireless connection. In general, each of the end-user client device 104 and the administrator client device 105 comprises an electronic computer device operable to receive, transmit, process, and store any appropriate data associated with the system 100 of FIG. 1. Each of the end-user client device 104 and the administrator client device 105 can include one or more client applications, including the client application 113 or an administrative application 133, respectively. A client application is any type of application that allows a client device to request and view content on the client device. In some implementations, a client application can use parameters, metadata, and other information received at launch to access a particular set of data from the server 102. In some instances, a client application may be an agent or client-side version of the one or more enterprise applications running on an enterprise server (not shown).

The client device 104 and the administrator client device 105 respectively include processor(s) 180 or processor(s) 182. Each processor 180 or 182 included in the end-user client device 104 or the administrator client device 105 may be a central processing unit (CPU), an application specific integrated circuit (ASIC), a field-programmable gate array (FPGA), or another suitable component. Generally, each processor 180 or 182 included in the end-user client device 104 or the administrator client device 105 executes instructions and manipulates data to perform the operations of the end-user client device 104 or the administrator client device 105, respectively. Specifically, each processor 180 or 182 included in the end-user client device 104 or the administrator client device 105 executes the functionality required to send requests to the server 102 and to receive and process responses from the server 102.

Each of the end-user client device 104 and the administrator client device 105 is generally intended to encompass any client computing device such as a laptop/notebook computer, wireless data port, smart phone, personal data assistant (PDA), tablet computing device, one or more processors within these devices, or any other suitable processing device. For example, the end-user client device 104 and/or the administrator client device 105 may comprise a computer that includes an input device, such as a keypad, touch screen, or other device that can accept user information, and an output device that conveys information associated with the operation of the server 102, or the client device itself, including digital data, visual information, or a GUI 183 or a GUI 184, respectively.

The GUI 183 and the GUI 184 each interface with at least a portion of the system 100 for any suitable purpose, including generating a visual representation of the client application 113 or the administrative application 133, respectively. In particular, the GUI 183 and the GUI 184 may each be used to view and navigate various Web pages. Generally, the GUI 183 and the GUI 184 each provide the user with an efficient and user-friendly presentation of business data provided by or communicated within the system. The GUI 183 and the GUI 184 may each comprise a plurality of customizable frames or views having interactive fields, pull-down lists, and buttons operated by the user. The GUI 183 and the GUI 184 each contemplate any suitable graphical user interface, such as a combination of a generic web browser, intelligent engine, and command line interface (CLI) that processes information and efficiently presents the results to the user visually.

Memory 194 and memory 196 respectively included in the end-user client device 104 or the administrator client device 105 may each include any memory or database module and may take the form of volatile or non-volatile memory including, without limitation, magnetic media, optical media, random access memory (RAM), read-only memory (ROM), removable media, or any other suitable local or remote memory component. The memory 194 and the memory 196 may each store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the respective client device.

There may be any number of end-user client devices 104 and administrative client devices 105 associated with, or external to, the system 100. Additionally, there may also be one or more additional client devices external to the illustrated portion of system 100 that are capable of interacting with the system 100 via the network(s) 108. Further, the term "client," "client device," and "user" may be used interchangeably as appropriate without departing from the scope of this disclosure. Moreover, while client device may be described in terms of being used by a single user, this disclosure contemplates that many users may use one computer, or that one user may use multiple computers.

Figure 2:
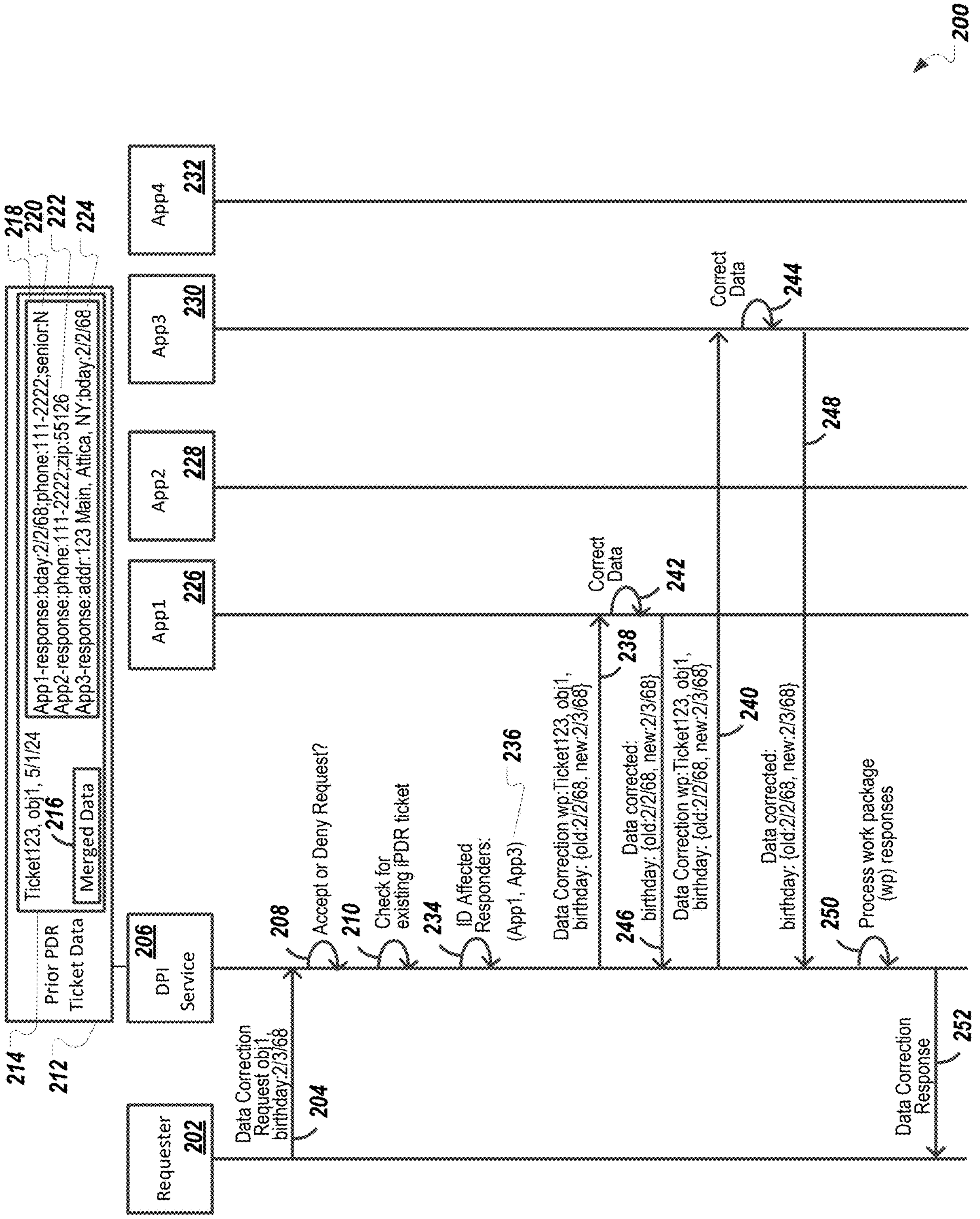
FIG. 2 is a swim lane diagram of an example process for integrated personal data correction.

FIG. 2 is a swim lane diagram of an example process 200 for integrated personal data correction. A requester 202 (e.g., requesting application or system) sends a data correction request 204 to a DPI service 206. The data correction request 204 is a request to update a birth date entry for a data subject corresponding to an "obj1" object identifier to a new value of "Feb. 3, 1968".

At 208, the DPI service 206 determines whether to accept or deny the data correction request 204. For example, the DPI service 206 can determine whether the "obj1" object identifier corresponds to a recognizable data subject. If the "obj1" object identifier does not correspond to a recognizable data subject, the DPI service 206 can deny the data correction request 204. Other examples, which are described in more detail below, can include situations in which the DPI service 206 denies data correction requests that are to correct data that is actually not inaccurate or data that may no longer be corrected, such as historical records that cannot be altered for legal reasons. In the displayed example, the DPI service 206 can accept the data correction request 204.

At 210, the DPI service 206 checks whether a prior PDR ticket data store 212 includes data for a prior PDR ticket for the data subject. If the DPI service 206 does not identify a prior PDR ticket corresponding to the data correction request 204, the DPI service 206 can initiate and coordinate the iPDR protocol for the data subject before processing the data correction request 204.

There may be various reasons why the DPI service 206 might not be able to locate a prior PDR ticket. The data subject may simply have submitted a correction request without having previously submitted a request for access to personal data, for example. As another example, the DPI service 206 can be configured to maintain prior PDR tickets for a certain period of time, and the data subject may have sent a correction request after a prior PDR ticket retention period has expired. In general, the data subject may request the correction of personal data after becoming aware of inaccurate personal data through means other than reviewing a result of PDR, such as by receiving correspondence from the data controller with incorrect personal data (e.g., a wrong spelling of a name), without the correspondence being a response to a data subject request (or any other message that would include an iPDR ticket). Other examples of a data subject becoming aware of incorrect personal data being stored by a data controller can include the data subject changing a name due to marriage, an address due to moving, etc. Still other examples for ways that personal data about the data subject may change while the data controller stores outdated and therefore inaccurate values can include changes to a person's job, association memberships, hobbies, views, preferences, insurance statuses, or other personal information.

Continuing with the example of FIG. 2, the DPI service 206 can identify prior ticket data 214 for a prior ticket with identifier "Ticket123", for the "obj1" object, that was logged on May 1, 2024. In some implementations, the prior ticket data 214 can include merged data 216 that includes data received from multiple responders and also provided in response to a prior PDR request. The prior ticket data 214 can also include specific responder responses 218, including prior PDR responses 220, 222, and 224 received from "App1" 226, "App2" 228, and "App3" 230 responders, respectively. An "App4" responder 232 may not have responded to the prior PDR request (or may have responded indicating that no personal data is stored for the data subject corresponding to the "obj1" object identifier).

At 234, the DPI service 206 can evaluate the specific responder responses 218 to identify affected responders for the data correction request by determining which responders store a birth date value for the data subject. For instance, the DPI service 206 can identify a birth date value in the prior PDR responses 220 and 224 previously received from the App1 responder 226 and the App3 responder 230, respectively. Accordingly, the DPI service 206 can determine App1 and App3 to be a set of affected responders 236 for the data correction request 204.

The DPI service 206 can send a data correction work package to each responder in the set of affected responders 236. For example, the DPI service 206 sends data correction work packages 238 and 240 to the App1 responder 226 and the App3 responder 230, respectively. The data correction work packages 238 and 240 each include the "obj1" object identifier (and possibly an object type indicator) and a new birth date value of Feb. 3, 1968. Other information can be included in data correction work packages. For instance and as shown, the data correction work packages 238 and 240 each include the old (e.g., incorrect) birth date values of Feb. 2, 1968 and a PDR ticket identifier of Ticket123 (e.g., corresponding to the prior ticket data 214).

Further examples of information that can be included in the data correction work packages can include a path to affected data values if the relevant data are present in a tree structure or if a tree structure can be useful for identifying the data. As another example, a data correction work package can include attachments, which in some cases can be provided to a data protection specialist. For instance, a scanned version of a received data subject request can be attached to the data correction work package. Other example types of attachments can include an assessment or order by a data protection specialist or data protection officer who initially assessed the data subject request which can inform, for example, a decentral data protection specialists about necessary actions relevant to the data correction request.

In some implementations, data correction work packages can include a flag (or a float number value, e.g., between 0.0 and 1.0) that indicates whether the correction can be executed without any other check or whether a manual check of the correction is recommended to be performed prior to applying the correction. If a float number indicator is included in the data correction work package rather than a flag indicator, the float number may indicate a likelihood that a manual check is useful (e.g., where a value of 1.0 can indicate that a manual check would not be useful and a value of 0.0 can indicate a highest degree of usefulness for a manual check, with lower float numbers generally indicating higher usefulness of manual checks). A data protection specialist who is familiar with a domain of a respective responder can decide whether a manual check is to be performed and can base such a decision on the float number of flag indicator.

Continuing with the example of FIGS. 2, at 242 and 244, the App1 responder 226 and the App3 responder 230 apply the correction specified in the data correction work package 238 or 240, respectively. For example, both the App1 responder 226 and the App3 responder 230 can locate a stored birth date value for the data subject and set the birth date value to the new birth date value included in the data correction work package 238 or 240, respectively. Other examples of corrective actions are described below.

At 246 and 248, the App1 responder 226 and the App3 responder 230 each respectively send a data correction work package response to the DPI service 206. Each illustrated data correction work package response indicates that data was corrected and indicates a prior and new value of the corrected data (e.g., corrected birth date). Other information can be included in data correction work package responses. For example, data correction work package responses can include 1) an indication or processing effort by the responder to correct data; 2) whether data was corrected automatically within the responder, by an external system, or by an administrator; 3) information indicating conditions (e.g., importance values) used for deciding whether a manual review or correction was performed or whether automatic correction was performed; and/or 4) recipient information indicating which recipients have been (or should be) informed about the correction if required. Other examples of data correction responses are described below.

At 250, the DPI service 206 processes data correction work package responses received from the relevant responders (e.g., App1 and App3 in this example). The DPI service 206 can, for example, determine, from information in the responses, whether further recipients are to be informed about an applied correction of personal data (and initiate such processing or inform another system or an administrator about a need for such processing). The DPI service 206 can also determine whether the data correction request was fulfilled completely by affected responders or whether a manual process (that is not part of DPI processing) is necessary to complete handling of the data correction request. If the DPI service 206 determines that further processing is needed to handle the data correction request, the DPI service 206 can inform an administrator, for example. In general, data correction results can be provided to administrators for administrator review of integrated data correction. Data correction results can also be provided to developers and/or testers of any DPI or responder components that performed automated processing, for developers or testers review for determination of component correctness. As described in more detail below, data correction responses can be provided to one or more artificial intelligence or machine learning components, for training of and/or evaluation by those components.

At 252, the DPI service 206 sends a data correction response to the requester 202. The requester 202 can enable the data subject to view the data correction response, as appropriate. The data correction response can indicate whether data correction was performed completely across multiple applications/responders in the landscape.

Figure 3:
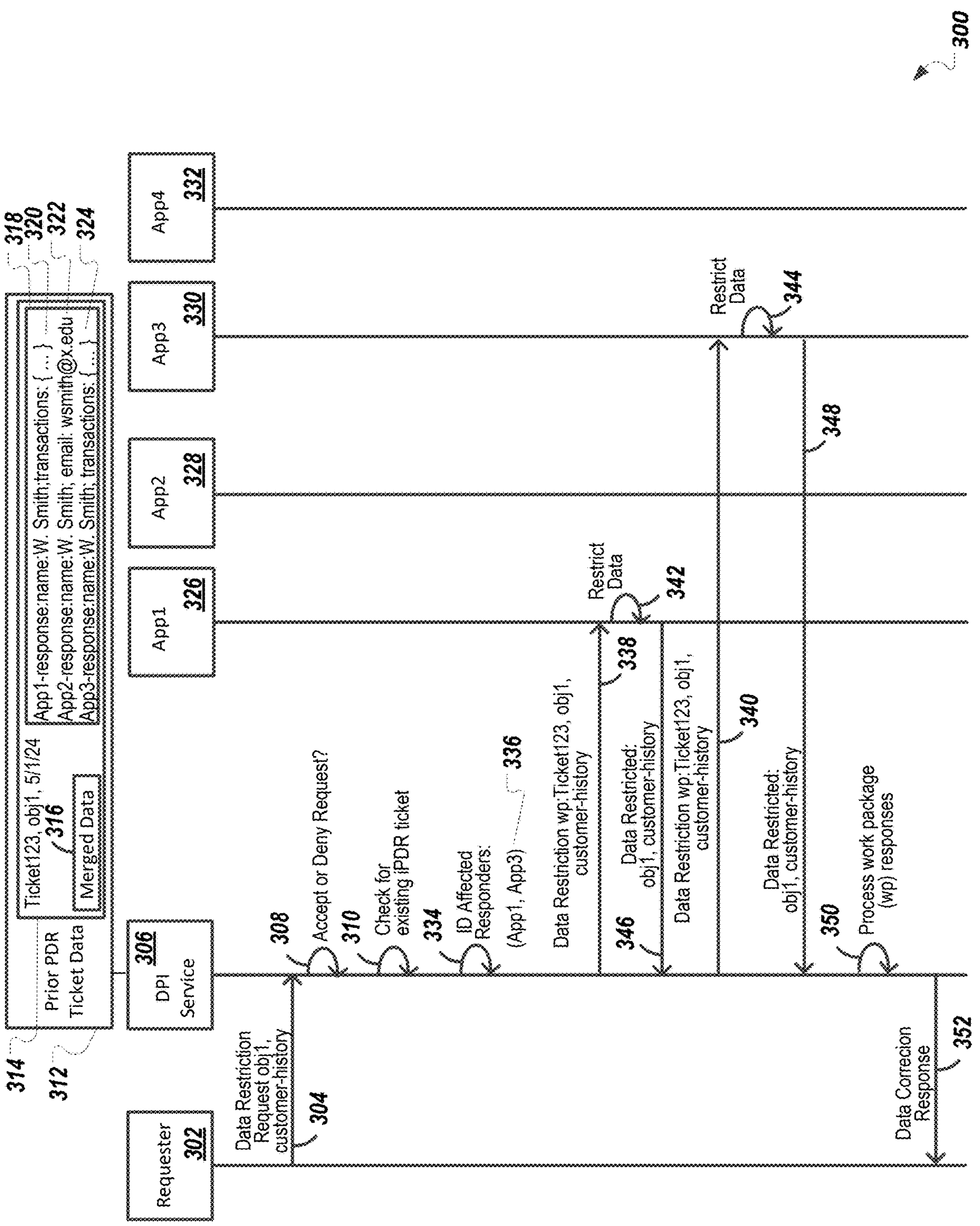
FIG. 3 is a swim lane diagram of an example process for integrated personal data restriction.

FIG. 3 is a swim lane diagram of an example process 300 for integrated personal data restriction. A requester 302 (e.g., requesting application or system) sends a data restriction request 304 to a DPI service 306. The data restriction request 304 is a request to restrict processing of personal data for a data subject represented by an "obj1" object for a data category of customer history (e.g., customer transaction history).

At 308, the DPI service 306 determines whether to accept or deny the data restriction request 304. For example, the DPI service 306 can determine whether the "obj1" object identifier corresponds to a recognizable data subject. If the "obj1" object identifier does not correspond to a recognizable data subject, the DPI service 306 can deny the data restriction request 304. As another example, if the DPI service 306 determines that no responders process data for which the restriction of processing is requested, the DPI service 306 can deny the data restriction request 304. Determining that no responders process the data for which the restriction of processing is requested can be performed in conjunction with identifying relevant responders processing described below.

At 310, the DPI service 306 checks whether a prior PDR ticket data store 312 includes data for a prior PDR ticket for the data subject. If the DPI service 306 does not identify a prior PDR ticket corresponding to the data restriction request 304, the DPI service 306 can initiate and coordinate the iPDR protocol for the data subject before processing the data restriction request 304.

The DPI service 306 can identify prior ticket data 314 for a prior ticket with identifier "Ticket123", for the "obj1" object, that was logged on May 1, 2024. In some implementations, the prior ticket data 314 can include merged data 316 that includes data received from multiple responders and also provided in response to a prior PDR request. The prior ticket data 314 can also include specific responder responses 318, including prior PDR responses 320, 322, and 324 received from "App1" 326, "App2" 328, and "App3" 330 responders, respectively. An "App4" responder 332 may not have responded to the prior PDR request (or may have responded indicating that no personal data is stored for the data subject corresponding to the "obj1" object identifier).

At 334, the DPI service 306 can evaluate the specific responder responses 318 to identify affected responders for the data restriction request by determining which responders store transaction history for the data subject. For instance, the DPI service 306 can identify transactional data in the prior PDR responses 320 and 324 previously received from the App1 responder 326 and the App3 responder 330, respectively. Accordingly, the DPI service 306 can determine App1 and App3 to be a set of affected responders 336 for the data restriction request 304. Further details of identifying affected responders with respect to data restriction requests are described below.

After affected responders are identified, the DPI service 306 can send a data restriction work package to each responder in the set of affected responders 336. For example, the DPI service 306 sends data restriction work packages 338 and 340 to the App1 responder 326 and the App3 responder 330, respectively. The data restriction work packages 338 and 340 each include the "obj1" object identifier and an indication of a type of data to restrict (e.g., customer history). Data restriction work packages can also include other information, similar to the other data correction work package information examples described above.

A 342 and 344, the App1 responder 326 and the App3 responder 330 take action to locally restrict data in accordance with information specified in the data restriction work package 338 or 340, respectively. For example, each of the App1 and App3 responders 326 and 330 can determine that the data requested to be restricted can be locally restricted and each responder can take respective action to implement the requested data restriction. In some cases, a given responder may determine that a data restriction request cannot be currently implemented by the responder. For instance, a responder can determine that a certain processing ground (e.g., processing required) is configured in or for the responder in association with a purpose for which data is processed. Accordingly, the responder can determine to deny a request for the restriction of processing.

As another example, in some implementations, after data is restricted, processing done by responders in response to future iPDR requests can include marking restricted data as restricted in a provided iPDR report. As another example, a future iPDR request may include a flag indicating export of personal data which is not restricted, and the responder can exclude from an iPDR report data that has been restricted.

In the example of FIGS. 3, At 346 and 348, the App1 responder 326 and the App3 responder 330 each respectively send a data restriction work package response to the DPI service 306. Each illustrated data restriction work package response indicates that data was restricted in the respective responder, as requested. Other information can be included in data restriction work package responses. For example, data restriction work package responses can include 1) an indication or processing effort by the responder to restrict data; 2) whether data was restricted automatically within the responder, by an external system, or by an administrator; 3) information indicating conditions (e.g., importance values) used for deciding whether a manual configuration was performed or whether automatic restriction was performed; and/or 4) recipient information indicating which recipients have been (or should be) informed about the restriction if required.

At 350, the DPI service 306 processes data restriction work package responses received from the relevant responders (e.g., App1 and App3 in this example). The DPI service 306 can, for example, determine, from information in the responses, whether further recipients are to be informed about an applied restriction of personal data (and initiate such processing or inform another system or an administrator about a need for such processing). The DPI service 306 can also determine whether the data restriction request was fulfilled completely by affected responders or whether a manual process (that is not part of DPI processing) is necessary to complete handling of the data restriction request 304. If the DPI service 306 determines that further processing is needed to handle the data restriction request 304, the DPI service 306 can inform an administrator, for example. In general, data restriction results can be provided to administrators for administrator review of integrated data restriction. Data restriction results can also be provided to developers and/or testers of any DPI or responder components that performed automated processing, for developers or testers review for determination of component correctness. As described in more detail below, data restriction responses can be provided to one or more artificial intelligence or machine learning components, for training of and/or evaluation by those components.

At 352, the DPI service 306 sends a data restriction response to the requester 302. The requester 302 can enable the data subject to view the data restriction response, as appropriate. The data restriction response can indicate whether data restriction was performed completely across multiple applications/responders in the landscape.

Figure 4:
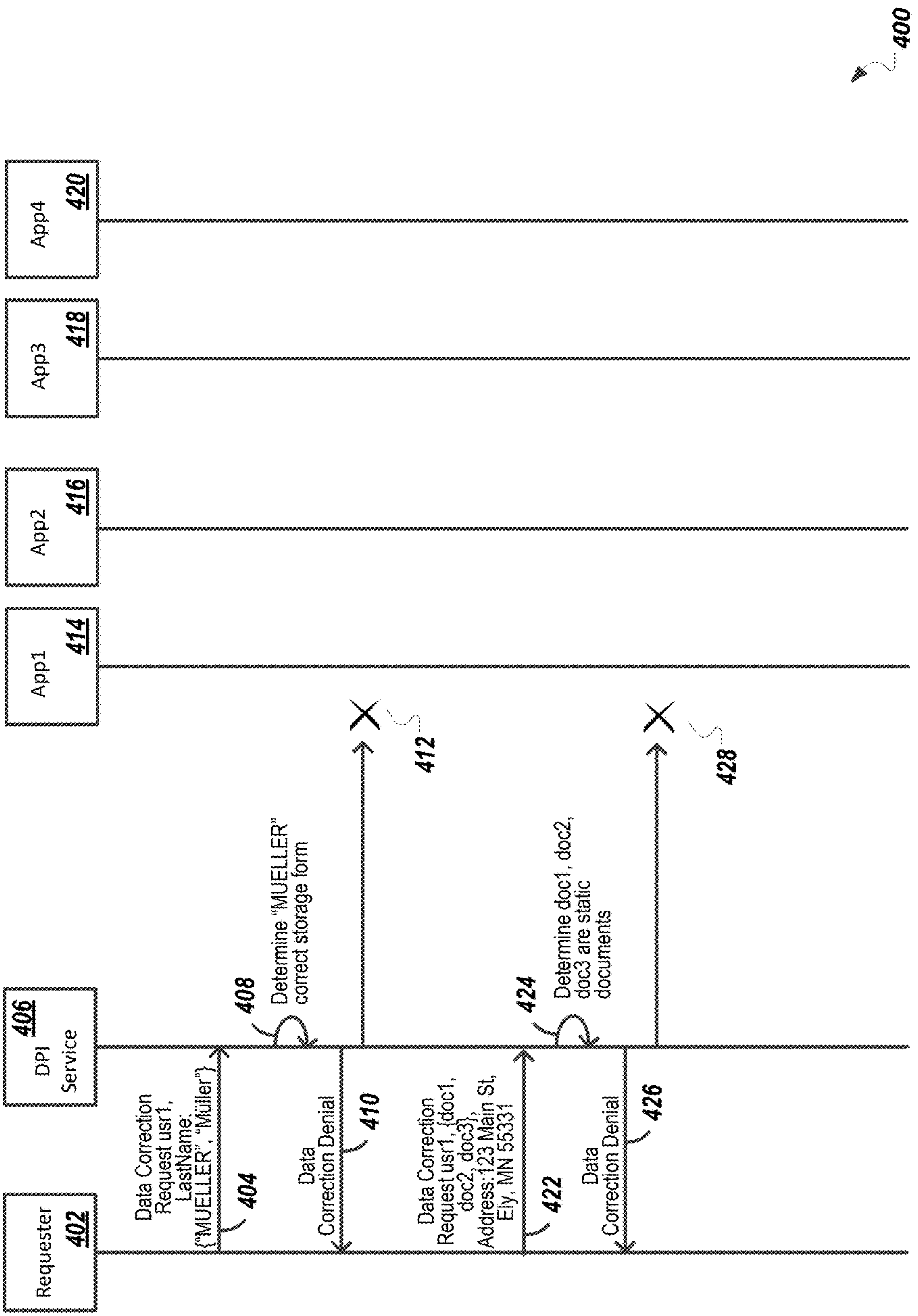
FIG. 4 is a swim lane diagram illustrating denial of personal data correction requests.

FIG. 4 is a swim lane diagram 400 illustrating denial of personal data correction requests. A requester 402 (e.g., requesting application or system) sends a data correction request 404 to a DPI service 406. The data correction request 404 is a request to update a last name of a data subject with identifier of "usr1" to a new last name value of "Müller" from a current value of "MUELLER". At 408, the DPI service 406 can, as part of determining whether to accept or deny the data correction request 404, determine that a system approach for storing names with umlaut characters such as "Müller" is to store the name without an umlaut (e.g., as "MUELLER"). The DPI service 406 can therefore determine that the current value is correct and that the data correction request 404 is to be denied. Accordingly, the DPI service 406 can send a data correction denial 410 to the requester 402, without sending (as indicated by a symbol 412) data correction work packages to responders 414, 416, 418, or 420 in the landscape. Other name correction denial examples can include the DPI service 406 determining that a currently stored abbreviated name or a name without stored accents is a correct/acceptable data value. In general, the DPI service 406 can determine whether the data controller actually considers data as inaccurate when considering a purpose for which data is processed, or whether data can be seen as accurate, just expressed in another form as the requested update.

As another example, the requester 402 can send a data correction request 422 to the DPI service 406. The data correction request 422 is a request to change address information for the "usr1" user to a new address in documents with identifiers "doc1", "doc2", and "doc3". At 424, the DPI service 406 determines that the doc1, doc2, and doc3 documents are static documents (e.g., historical invoices, legal contracts) and, for legal reasons, have to remain unchanged. Accordingly, the DPI service 406 can determine that at least the request to change the address in those documents is to be denied. However, an update request for address change in master data and information used for future transactional data for the "usr1" user might be deemed acceptable (e.g., if the data correction request 422 and/or another data correction request corresponds to a request to update such information).

In response to the determination at step 424 that the doc1, doc2, and doc3 documents are static unchangeable documents, the DPI service 406 can send a data correction denial 426 to the requester. As indicated by a symbol 428, no data correction work packages are sent to any of the responders 414, 416, 418, or 420 in response to receiving the data correction request 422.

Figure 5:
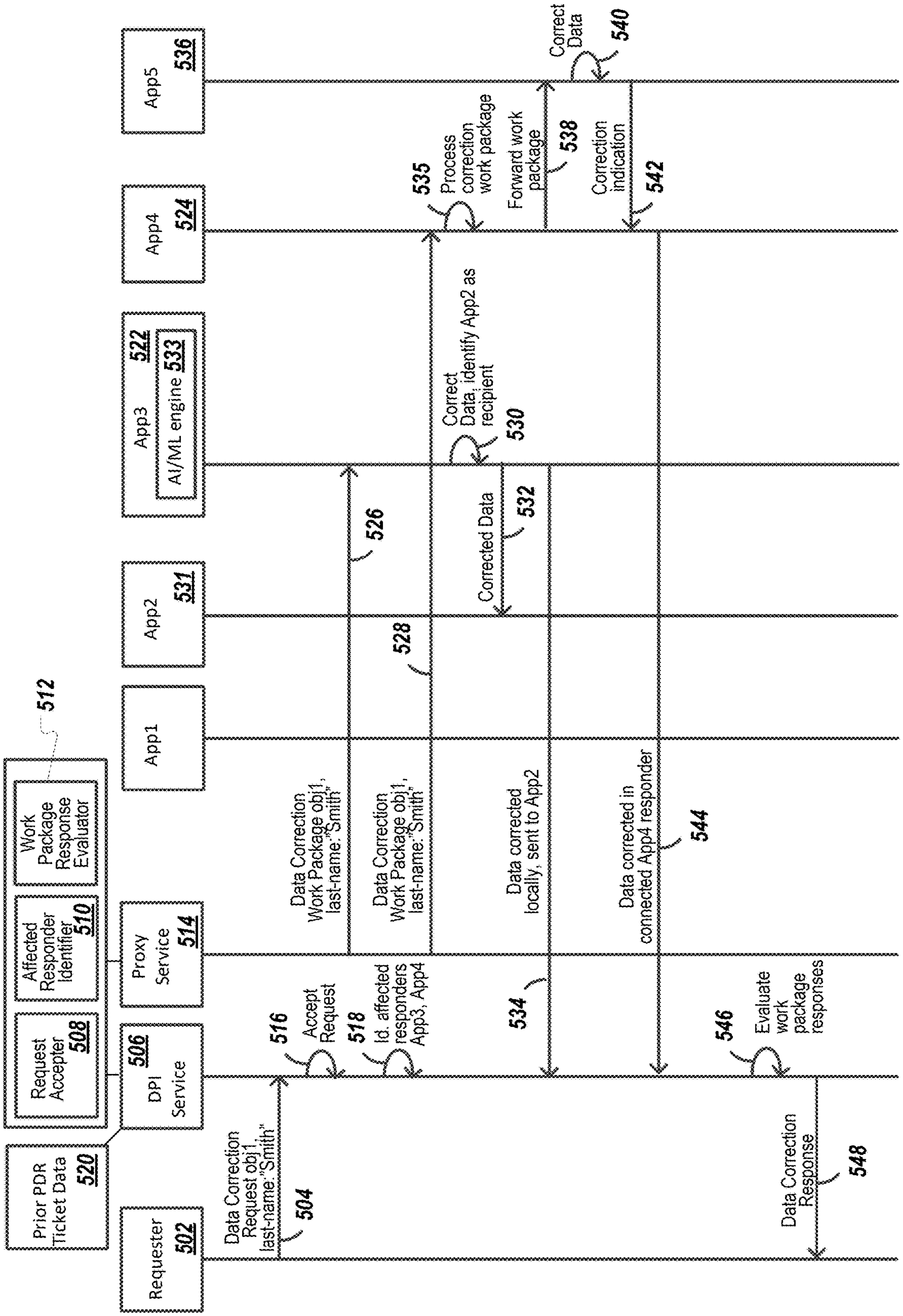
FIG. 5 is a swim lane diagram of an example process for integrated personal data correction.

FIG. 5 is a swim lane diagram of an example process 500 for integrated personal data correction. A requester 502 (e.g., requesting application or system) sends a data correction request 504 to a DPI service 506. The data correction request 504 is a request to update a last name entry for a data subject corresponding to an "obj1" object identifier to a new value of "Smith". The data correction request 504 may be submitted based on the data subject becoming married and changing a last name, for example.

The DPI service 506 can include or use various engines for different specific tasks with respect to data correction (and similarly for data restriction). For example, a request accepter 508 be configured to determine whether to accept a given data correction or data restriction request, an affected responder identifier 510 can be configured to determine a set of affected responders that may be affected by the request, and a work package response evaluator 512 can be configured to evaluate responses to data correction and/or data restriction work package responses sent by responders.

The request accepter 508, the affected responder identifier 510, and the work package response evaluator 512 can each be automated engines (e.g., programmed engines), AI/ML engines, or a combination of programmed or self-learning engines. In some implementations, each of the request accepter 508, the affected responder identifier 510, and the work package response evaluator 512 may be included in the DPI service 506. In other implementations, one or more of the request accepter 508, the affected responder identifier 510, or the work package response evaluator 512 may be implemented in or as a proxy service 514 that is connected to the DPI service 506 and which is invoked by the DPI service 506 to perform various actions on behalf of the DPI service 506. In this example, the request accepter 508, the affected responder identifier 510, and the work package response evaluator 512 are described as sub-components of the DPI service 506, but in other examples, the DPI service 506 can invoke the proxy service 514 to perform such services.

At 516, the request accepter 508 portion of the DPI service 506 evaluates the data correction request 504 to determine whether the data correction request 504 should be accepted or denied. For example, the requester accepter 508 can learn, be trained to, or be configured to determine that certain requests are excessive or duplicate requests that at least substantially match one or more recently-denied requests that were denied, for example, within a recent time window of a predetermined size. As another example, the request accepter 508 can learn, be trained to, or be configured to determine certain requests matching certain patterns can be denied (e.g., as for certain characters or types of characters in a last name, as described in examples above). In some cases, the request accepter 508 can forward certain requests to a human expert and the request accepter 508 can learn how to automatically accept or reject future requests based on expert handling of forwarded requests. In the example of FIG. 5, the request accepter 508 determines that the data correction request 504 is accepted.

At 518, the affected responder identifier 510 portion of the DPI service 506 identifies affected responders that may be affected by the data correction request 504. For example, the affected responder identifier 510 can automatically evaluate responder responses included in prior PDR ticket data 520. The affected responder identifier 510 can determine, for example, for each responder in the landscape, whether the responder has reported that the responder stores personal data which is to be corrected or whether the responder has not reported storing or using the personal data item(s) that are to be corrected. Similarly for data restriction requests, the affected responder identifier 510 can determine, for each responder in the landscape, whether the responder has reported that the responder processes personal data which is to be restricted or whether the responder has not reported processing the personal data item(s) that are to be restricted. In general, the affected responder identifier 510 can learn, be trained to, or be configured to determine, (e.g., with sufficient confidence), based on historic data in the context of previous data subject requests (e.g., by the same or other data subjects) whether a given responder is affected by the data subject request. In the example of FIG. 5, the affected responder identifier 510 has automatically identified an App3 responder 522 and an App4 responder 524 as affected responders.

The DPI service 506 can send data correction work packages 526 or 528 to the App3 responder 522 or the App4 responder 524, respectively. At 530, the App3 responder 522 applies the correction specified in the data correction work package 526. For example, the App3 responder 522 can locally locate a stored last name value for the data subject and set the last name value to the new value "Smith" specified in the data correction work package 526.

In some implementations, the App3 responder 522 can identify recipients of corrected data. For example, the App3 responder 522 can identify that an App2 responder 531 and/or one or more other types of recipients are recipients of the data to be corrected. For example, the App3 responder 522 can evaluate read access log(s), other types of logs, and/or configuration information in the responder 522 to identify users or applications as potential recipients. For example, a log entry may indicate that the App2 responder 531 is a recipient. As another example, configuration information may indicate that for specific data (e.g., under specific circumstances or independent from specific circumstances) certain entities are recipients of the data. In some cases, the App3 responder 522 sends corrected data to recipients, as illustrated by a forwarding 532 of corrected data to the App2 responder 531. In other implementations, the App3 responder 522 may rely on being a leading system in a data distribution configuration that automatically distributes data periodically to downstream systems, of which the App2 responder 531 may be an example. In still other implementations, a responder may indicate to the DPI service 506 that one or more recipients may need to or may be able to be notified, as described below.

In some implementations, a responder can include AI and/or ML functionality for performing corrections (or restricting processing) such as an AI/ML engine 533 included in or used by the App3 responder 522. The AI/ML engine 533 can learn, be trained to, or be configured to automatically accept or deny received data correction or restriction work packages, locate data to correct or restrict, and apply data correction or restriction locally in the App3 responder 522.

As another example, the AI/ML engine 533 can be trained to determine whether a specific correction request can be automatically applied by the App3 responder 522, whether an expert should be notified about at least assisting with or approving the correction, or whether an expert should be involved in determining whether to accept or deny a correction request. Similar processing can be performed for data restriction requests.

At 534, the App3 responder 522 sends a data correction work package response to the DPI service 506. The data correction work package response indicates that the App3 responder 522 locally corrected personal data for the data subject in the App3 responder 522 and has sent corrected data to the App2 responder as a recipient.

At 535, the App4 responder 524 processes the received data correction work package. The App4 responder 524 determines that the App4 responder 524 receives the personal data to be corrected (e.g., the last name of the data subject, and possibly other personal data) from an App5 responder 536. That is, a given responder such as the App4 responder 524 can determine that 1) data to correct originates from another responder and is replicated into the given responder; 2) the given responder has a data storage that is kept synchronous to the data storage of the other responder with the other responder being a leading system; and 3) the data to correct should be corrected in the other responder. The given responder can use an appropriate mechanism to inform the leading system to request that the leading system perform the respective data correction in the leading system so that the corrected data will later be replicated to the given responder. Similar determinations and communications can be performed by responders for data restriction requests, that data restriction may need to be implemented in another connected system different from a responder who initially receives a data restriction work package.

At 538, the App4 responder 524 forwards the data correction work package (or another instructional message or request) to the App5 responder 536. At 540, the App5 responder 536 performs the requested data correction. At 542, the App5 responder 536 sends a correction indication to the App4 responder 524 informing the App4 responder 524 that the requested data correction was performed in the App5 responder 536. At 544, the App4 responder 524 sends a data correction work package response to the DPI service 506 that informs the DPI service 506 that the requested correction request was forwarded to and applied in the App5 responder 536.

At 546, the DPI service 506 evaluates data correction work package responses. The DPI service 506 can include and/or use the work package response evaluator 512 to automatically evaluate data correction (and data restriction) work package responses. The work package response evaluator 512 can determine whether all affected responders successfully corrected (or successfully initiated another appropriate system to correct) personal data referenced in respective data correction work packages. Additionally, the work package response evaluator 512 can self-optimize for making better future decisions by the work package response evaluator 512 and/or by other engines or components of the DPI service 506. For example, the work package response evaluator 512 can recognize that the work package response received from the App4 responder indicates that the correction was actually performed in the App5 responder 536. The work package response evaluator 512 can inform the affected responder identifier 510 about the App5 responder 536 performing the correction, and the affected responder identifier 510 can learn to include the App5 responder 536 as an affected responder for future similar data correction requests. Similar determinations and learning can occur for data restriction processing.

In some cases, some stages of integrated data correction or data restriction can be implemented via multiple cycles. For instance, rather than the App4 responder 524 forwarding a data correction request to the App5 responder 536 the App4 responder 524 can inform the DPI service 506 in a data correction work package response that data was not corrected due to data being received by the App4 responder 524 from the App5 responder 536 as a leading system. The affected responder identifier 510 can thus identify the App5 responder 536 as an affected responder for this work package and send the data correction work package to the App5 responder 536 as part of the current integrated data correction protocol run.

Furthermore, the work package response evaluator 512 can identify whether any received work package response indicates a recipient to which corrected data, a notification about corrected data, or a notification about restriction of processing should be sent. The work package response evaluator 512 (or more generally the DPI service 506 can send such data or notifications in some cases or may inform an administrator so that the administrator can initiate providing recipients of data or notifications.

The work package response evaluator 512 can determine whether the data correction request was fulfilled completely by affected responders. In this example, the work package response evaluator 512 can determine that all affected responders have successfully corrected (or initiated correction of) data requested to be corrected.

At 548, the DPI service 506 sends a data correction response to the requester 502. The requester 502 can enable the data subject to view the data correction response, as appropriate. The data correction response can indicate whether data correction was performed completely across multiple applications/responders in the landscape.

Figure 6:
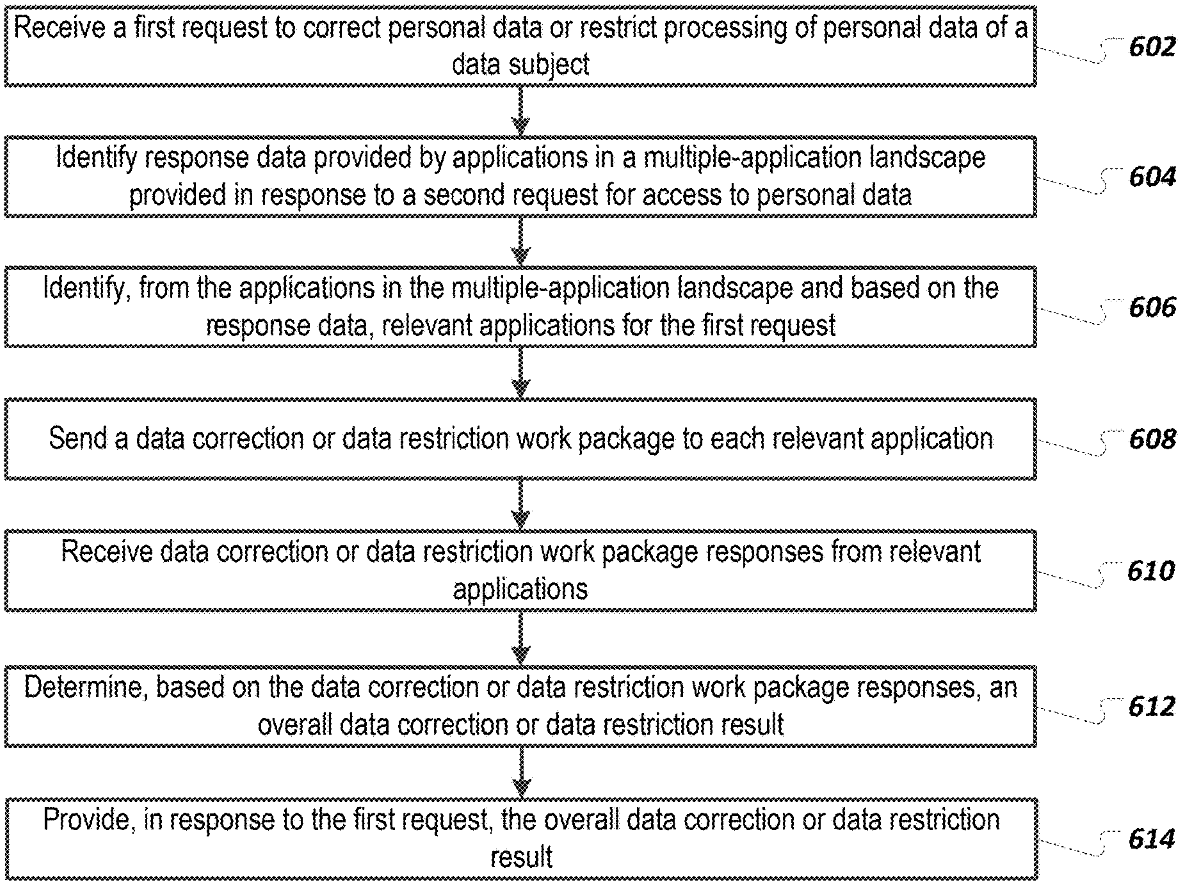
FIG. 6 is a flowchart of an example method for integrated personal data correction or restriction.

FIG. 6 is a flowchart of an example method 600 for integrated personal data correction or restriction. It will be understood that method 600 and related methods may be performed, for example, by any suitable system, environment, software, and hardware, or a combination of systems, environments, software, and hardware, as appropriate. For example, one or more of a client, a server, or other computing device can be used to execute method 600 and related methods and obtain any data from the memory of a client, the server, or the other computing device. In some implementations, the method 600 and related methods are executed by one or more components of the system 100 described above with respect to FIG. 1. For example, the method 600 and related methods can be executed by the data privacy integration service 117 of FIG. 1.

At 602, a data privacy integration service receives a first request to correct personal data or restrict processing of personal data of a data subject. The data privacy integration service can evaluate the first request and automatically determine to accept the first request. The data privacy integration service can evaluate a second data correction or data restriction request and automatically determine to deny the second request. Automatically determining to accept the first request and automatically determining to deny the second request can be automatically performed by a trained machine learning engine.

At 604, the data privacy integration service identifies response data provided by applications in a multiple-application landscape provided in response to a second request for access to personal data processed by respective applications in the multiple-application landscape. The second request can be a previous request provided by the data subject for access to personal data processed by applications in the multiple-application landscape and identifying the response data can include identifying application responses provided in response to the second request. As another example, identifying the response data can include: determining that no response data is available for any prior requests for the data subject for personal data processed by applications in the multiple-application landscape; in response to determining that no response data is available for any prior requests for the data subject for personal data processed by applications in the multiple-application landscape, initiating an integrated personal data retrieval protocol for applications in the multiple-application landscape; and identifying as the response data, responses from applications in the multiple-application landscape to the integrated personal data retrieval protocol.

At 606, the data privacy integration service identifies, from the applications in the multiple-application landscape and based on the response data, relevant applications for the first request. Relevant applications can be applications that store data requested to be corrected or applications that process data for which processing is requested to be restricted. The relevant engines can be identified by a trained machine learning engine.

At 608, the data privacy integration service sends a data correction or data restriction work package to each relevant application. Relevant applications can perform data correction in response to data correction work packages and perform restriction of processing in response to data restriction work packages. In some implementations, a relevant application uses, in response to receiving a data correction or data restriction work package, a trained machine learning engine to automatically determine whether the relevant application accepts or denies the data correction or data restriction work package. In some implementations, a relevant application uses, in response to receiving a data correction or data restriction work package, a trained machine learning engine to automatically determine whether the first relevant application can automatically apply a requested data correction or data restriction in the relevant application or whether the relevant application informs an administrator to at least partially apply the data correction or data restriction.

As another example, a first relevant application, in response to receiving a data correction or data restriction work package, can determine that the first relevant application receives data to be corrected or restricted from a second application in the multiple-application landscape and forward information from the data correction or data restriction work package to the second application, so that the second application can perform relevant data correction or data processing restriction. The first relevant application can receive a notification from the second application that data has been corrected or restricted in the second application. The first relevant application can then include, in a data correction or data restriction work package response sent to the data privacy integration service, information indicating that data has been corrected or restricted in the second application. The data privacy integration service can learn to include the second application as a relevant application for future requests that are similar to the first request.

At 610, the data privacy integration service receives data correction or data restriction work package responses from relevant applications. A first data correction or data restriction work package response can indicate one or more recipients of corrected or restricted data and the data privacy integration service can initiate sending of a message to at least one recipient informing the recipient of the corrected or restricted data.

At 612, the data privacy integration service determines, based on the data correction or data restriction work package responses, an overall data correction or data restriction result.

At 614, the data privacy integration service provides, in response to the first request, the overall data correction or data restriction result.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

EXAMPLES

In view of the above described implementations of subject matter this application discloses the following list of examples, wherein one feature of an example in isolation or more than one feature of said example taken in combination and, optionally, in combination with one or more features of one or more further examples are further examples also falling within the disclosure of this application.

Example 1. A computer-implemented method comprising:

- receiving, at a data privacy integration service, a first request to correct personal data or restrict processing of personal data of a data subject;
- identifying, by the data privacy integration service, response data provided by applications in a multiple-application landscape provided in response to a second request for access to personal data processed by respective applications in the multiple-application landscape;
- identifying, by the data privacy integration service and from the applications in the multiple-application landscape and based on the response data, relevant applications for the first request;
- sending, by the data privacy integration service, a data correction or data restriction work package to each relevant application;
- receiving, by the data privacy integration service, data correction or data restriction work package responses from relevant applications;
- determining, by the data privacy integration service and based on the data correction or data restriction work package responses, an overall data correction or data restriction result; and
- providing, by the data privacy integration service, in response to the first request, the overall data correction or data restriction result.

Example 2. The computer-implemented method of Example 1, further comprising evaluating the first request and automatically determining to accept the first request.

Example 3. The computer-implemented method of any of the preceding Examples, further comprising:

- receiving a third request to correct personal data or restrict processing of personal data of a data subject; and
- automatically determining to deny the third request.

Example 4. The computer-implemented method of any of the preceding Examples, wherein automatically determining to accept the first request and automatically determining to deny the third request are automatically performed by a trained machine learning engine.

Example 5. The computer-implemented method of any of the preceding Examples, wherein:

- the second request is a previous request provided by the data subject for access to personal data processed by applications in the multiple-application landscape; and
- identifying the response data comprises identifying application responses provided in response to the second request.

Example 6. The computer-implemented method of any of the preceding Examples, wherein identifying the response data comprises:

- determining that no response data is available for any prior requests for the data subject for personal data processed by applications in the multiple-application landscape;

in response to determining that no response data is available for any prior requests for the data subject for personal data processed by applications in the multiple-application landscape, initiating an integrated personal data retrieval protocol for applications in the multiple-application landscape; and identifying as the response data, responses from applications in the multiple-application landscape to the integrated personal data retrieval protocol.

Example 7. The computer-implemented method of any of the preceding Examples, wherein:

the first request is a request to correct first personal data; and identifying the relevant applications for the first request comprises evaluating the response data to identify applications that store the first personal data.

Example 8. The computer-implemented method of any of the preceding Examples, wherein:

the first request is a request to restrict processing of first personal data; and identifying the relevant applications for the first request comprises evaluating the response data to identify applications that process the first personal data.

Example 9. The computer-implemented method of any of the preceding Examples, wherein the relevant applications for the first request are identified using a trained machine learning engine.

Example 10. The computer-implemented method of any of the preceding Examples, wherein:

a first data correction or data restriction work package response indicates one or more recipients of corrected or restricted data; and the method further comprises initiating, by the data privacy integration service, sending of a message to at least one recipient informing the recipient of the corrected or restricted data.

Example 11. The computer-implemented method of any of the preceding Examples, wherein at least one relevant application performs data correction in response to a data correction work package.

Example 12. The computer-implemented method of any of the preceding Examples, wherein at least one relevant application performs restriction of data processing in response to a data restriction work package.

Example 13. The computer-implemented method of any of the preceding Examples, wherein a first relevant application uses, in response to receiving a data correction or data restriction work package, a trained machine learning engine to automatically determine whether the first relevant application accepts or denies the data correction or data restriction work package.

Example 14. The computer-implemented method of any of the preceding Examples, wherein a first relevant application uses, in response to receiving a data correction or data restriction work package, a trained machine learning engine to automatically determine whether the first relevant application can automatically apply a requested data correction or data restriction in the first relevant application or whether the first relevant application informs an administrator to at least partially apply the data correction or data restriction.

Example 15. The computer-implemented method of any of the preceding Examples, wherein a first relevant application, in response to receiving a data correction or data restriction work package:

determines that the first relevant application receives data to be corrected or restricted from a second application in the multiple-application landscape; and forwards information from the data correction or data restriction work package to the second application.

Example 16. The computer-implemented method of any of the preceding Examples, wherein:

the first relevant application receives a notification from the second application that data has been corrected or restricted in the second application; and the first relevant application includes, in a data correction or data restriction work package response sent to the data privacy integration service, information indicating that data has been corrected or restricted in the second application.

Example 17. The computer-implemented method of any of the preceding Examples, further comprising automatically determining, by the data privacy integration service, to include the second application as a relevant application for future requests that are similar to the first request.

Example 18. A system comprising:

one or more computers; and a computer-readable medium coupled to the one or more computers having instructions stored thereon which, when executed by the one or more computers, cause the one or more computers to perform operations comprising:

receiving, at a data privacy integration service, a first request to correct personal data or restrict processing of personal data of a data subject;

identifying, by the data privacy integration service, response data provided by applications in a multiple-application landscape provided in response to a second request for access to personal data processed by respective applications in the multiple-application landscape;

identifying, by the data privacy integration service and from the applications in the multiple-application landscape and based on the response data, relevant applications for the first request;

sending, by the data privacy integration service, a data correction or data restriction work package to each relevant application;

receiving, by the data privacy integration service, data correction or data restriction work package responses from relevant applications;

determining, by the data privacy integration service and based on the data correction or data restriction work package responses, an overall data correction or data restriction result; and providing, by the data privacy integration service, in response to the first request, the overall data correction or data restriction result.

Example 19. The system of Example 18, wherein:

the second request is a previous request provided by the data subject for access to personal data processed by applications in the multiple-application landscape; and identifying the response data comprises identifying application responses provided in response to the second request.

Example 20. A computer program product encoded on a non-transitory storage medium, the product comprising non-transitory, computer readable instructions for causing one or more processors to perform operations comprising:

receiving, at a data privacy integration service, a first request to correct personal data or restrict processing of personal data of a data subject;

identifying, by the data privacy integration service, response data provided by applications in a multiple-application landscape provided in response to a second request for access to personal data processed by respective applications in the multiple-application landscape;

identifying, by the data privacy integration service and from the applications in the multiple-application landscape and based on the response data, relevant applications for the first request;

sending, by the data privacy integration service, a data correction or data restriction work package to each relevant application;

receiving, by the data privacy integration service, data correction or data restriction work package responses from relevant applications;

determining, by the data privacy integration service and based on the data correction or data restriction work package responses, an overall data correction or data restriction result; and providing, by the data privacy integration service, in response to the first request, the overall data correction or data restriction result.

What is claimed is:

1. A computer-implemented method comprising:

receiving, at a data privacy integration service, a first request to correct personal data or restrict processing of personal data of a data subject;

identifying, by the data privacy integration service, response data provided by applications in a multiple-application landscape provided in response to a second request for access to personal data processed by respective applications in the multiple-application landscape;

identifying, by the data privacy integration service and from the applications in the multiple-application landscape and based on the response data, relevant applications for the first request that store data requested to be corrected or that process data for which processing is requested to be restricted;

sending, by the data privacy integration service, a data correction or data restriction work package to each relevant application, wherein a first relevant application, in response to receiving the data correction or data restriction work package:

determines that the first relevant application receives data to be corrected or restricted from a second application in the multiple-application landscape; and forwards information from the data correction or data restriction work package to the second application;

receiving, by the data privacy integration service, data correction or data restriction work package responses from relevant applications;

determining, by the data privacy integration service and based on the data correction or data restriction work package responses, an overall data correction or data restriction result; and providing, by the data privacy integration service, in response to the first request, the overall data correction or data restriction result.

2. The computer-implemented method of claim 1, further comprising evaluating the first request and automatically determining to accept the first request.

3. The computer-implemented method of claim 2, further comprising:

receiving a third request to correct personal data or restrict processing of personal data of a data subject; and automatically determining to deny the third request.

4. The computer-implemented method of claim 3, wherein automatically determining to accept the first request and automatically determining to deny the third request are automatically performed by a trained machine learning engine.

5. The computer-implemented method of claim 1, wherein:

the second request is a previous request provided by the data subject for access to personal data processed by applications in the multiple-application landscape; and identifying the response data comprises identifying application responses provided in response to the second request.

6. The computer-implemented method of claim 1, wherein identifying the response data comprises:

determining that no response data is available for any prior requests for the data subject for personal data processed by applications in the multiple-application landscape;

in response to determining that no response data is available for any prior requests for the data subject for personal data processed by applications in the multiple-application landscape, initiating an integrated personal data retrieval protocol for applications in the multiple-application landscape; and identifying as the response data, responses from applications in the multiple-application landscape to the integrated personal data retrieval protocol.

7. The computer-implemented method of claim 1, wherein:

the first request is a request to correct first personal data; and identifying the relevant applications for the first request comprises evaluating the response data to identify applications that store the first personal data.

8. The computer-implemented method of claim 1, wherein:

the first request is a request to restrict processing of first personal data; and identifying the relevant applications for the first request comprises evaluating the response data to identify applications that process the first personal data.

9. The computer-implemented method of claim 1, wherein the relevant applications for the first request are identified using a trained machine learning engine.

10. The computer-implemented method of claim 1, wherein:

a first data correction or data restriction work package response indicates one or more recipients of corrected or restricted data; and the method further comprises initiating, by the data privacy integration service, sending of a message to at least one recipient informing the recipient of the corrected or restricted data.

11. The computer-implemented method of claim 1, wherein at least one relevant application performs data correction in response to a data correction work package.

12. The computer-implemented method of claim 1, wherein at least one relevant application performs restriction of data processing in response to a data restriction work package.

13. The computer-implemented method of claim 1, wherein a first relevant application uses, in response to receiving a data correction or data restriction work package, a trained machine learning engine to automatically determine whether the first relevant application accepts or denies the data correction or data restriction work package.

14. The computer-implemented method of claim 1, wherein a first relevant application uses, in response to receiving a data correction or data restriction work package, a trained machine learning engine to automatically determine whether the first relevant application can automatically apply a requested data correction or data restriction in the first relevant application or whether the first relevant application informs an administrator to at least partially apply the data correction or data restriction.

15. The computer-implemented method of claim 1, wherein:

the first relevant application receives a notification from the second application that data has been corrected or restricted in the second application; and the first relevant application includes, in a data correction or data restriction work package response sent to the data privacy integration service, information indicating that data has been corrected or restricted in the second application.

16. A system comprising:

one or more computers; and a computer-readable medium coupled to the one or more computers having instructions stored thereon which, when executed by the one or more computers, cause the one or more computers to perform operations comprising:

receiving, at a data privacy integration service, a first request to correct personal data or restrict processing of personal data of a data subject;

identifying, by the data privacy integration service, response data provided by applications in a multiple-application landscape provided in response to a second request for access to personal data processed by respective applications in the multiple-application landscape;

identifying, by the data privacy integration service and from the applications in the multiple-application landscape and based on the response data, relevant applications for the first request that store data requested to be corrected or that process data for which processing is requested to be restricted;

sending, by the data privacy integration service, a data correction or data restriction work package to each relevant application, wherein a first relevant application, in response to receiving the data correction or data restriction work package:

determines that the first relevant application receives data to be corrected or restricted from a second application in the multiple-application landscape; and forwards information from the data correction or data restriction work package to the second application;

receiving, by the data privacy integration service, data correction or data restriction work package responses from relevant applications;

determining, by the data privacy integration service and based on the data correction or data restriction work package responses, an overall data correction or data restriction result; and providing, by the data privacy integration service, in response to the first request, the overall data correction or data restriction result.

17. The system of claim 16, wherein:

the second request is a previous request provided by the data subject for access to personal data processed by applications in the multiple-application landscape; and identifying the response data comprises identifying application responses provided in response to the second request.

18. A computer program product encoded on a non-transitory storage medium, the product comprising non-transitory, computer readable instructions for causing one or more processors to perform operations comprising:

receiving, at a data privacy integration service, a first request to correct personal data or restrict processing of personal data of a data subject;

identifying, by the data privacy integration service, response data provided by applications in a multiple-application landscape provided in response to a second request for access to personal data processed by respective applications in the multiple-application landscape;

identifying, by the data privacy integration service and from the applications in the multiple-application landscape and based on the response data, relevant applications for the first request that store data requested to be corrected or that process data for which processing is requested to be restricted;

sending, by the data privacy integration service, a data correction or data restriction work package to each relevant application, wherein a first relevant application, in response to receiving the data correction or data restriction work package:

determines that the first relevant application receives data to be corrected or restricted from a second application in the multiple-application landscape; and forwards information from the data correction or data restriction work package to the second application;

receiving, by the data privacy integration service, data correction or data restriction work package responses from relevant applications;

determining, by the data privacy integration service and based on the data correction or data restriction work package responses, an overall data correction or data restriction result; and providing, by the data privacy integration service, in response to the first request, the overall data correction or data restriction result.

* * * * *